(12) United States Patent
Lai et al.

(10) Patent No.: US 11,899,443 B2
(45) Date of Patent: Feb. 13, 2024

(54) OPERATIONAL PARAMETER BASED FLIGHT RESTRICTION

(71) Applicant: SZ DJI TECHNOLOGY CO., LTD., Shenzhen (CN)

(72) Inventors: Zhenzhou Lai, Shenzhen (CN); Chang Geng, Shenzhen (CN); Xi Chen, Shenzhen (CN); Bogao Xu, Shenzhen (CN); Lei Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/722,975

(22) Filed: Apr. 18, 2022

(65) Prior Publication Data

US 2022/0236730 A1 Jul. 28, 2022

Related U.S. Application Data

(63) Continuation of application No. 16/205,476, filed on Nov. 30, 2018, now Pat. No. 11,307,571, which is a continuation of application No. PCT/CN2016/083975, filed on May 30, 2016.

(51) Int. Cl.
*B64C 39/02* (2023.01)
*G05B 23/02* (2006.01)

(52) U.S. Cl.
CPC ........ *G05B 23/0289* (2013.01); *B64C 39/024* (2013.01); *B64U 2201/10* (2023.01)

(58) Field of Classification Search
CPC ............. G05B 23/0289; B64C 39/024; B64U 2201/10; G05D 1/0055
USPC ...................................................... 701/1, 11
See application file for complete search history.

(56) References Cited

U.S. PATENT DOCUMENTS

| 5,754,965 | A | * | 5/1998 | Hagenbuch | ............ | G07C 5/008 |
| | | | | | | 701/33.9 |
| 6,038,498 | A | * | 3/2000 | Briffe | ..................... | G01C 23/00 |
| | | | | | | 701/14 |
| 6,230,554 | B1 | | 5/2001 | Kramer | | |
| 9,043,106 | B2 | | 5/2015 | Ingram et al. | | |
| 9,269,205 | B1 | * | 2/2016 | Lamkin | ................ | G06Q 10/04 |

(Continued)

FOREIGN PATENT DOCUMENTS

| CN | 101590914 A | 12/2009 |
| CN | 101890917 A | 11/2010 |

(Continued)

OTHER PUBLICATIONS

The World Intellectual Property Organization (WIPO) International Search Report and Written Opinion for PCT/CN2016/083975 dated Feb. 21, 2017 8 pages.

*Primary Examiner* — Jaime Figueroa
(74) *Attorney, Agent, or Firm* — ANOVA LAW GROUP, PLLC

(57) ABSTRACT

A system for operating a vehicle includes a first temperature sensor located at a first location and configured to measure a first temperature; a second temperature sensor located at a second location configured to measure a second temperature; and one or more processors. The one or more processors are individually or collectively configured to receive information regarding the first temperature and/or the second temperature; process the information; and impose a restriction affecting operation of the vehicle based on the processed information.

19 Claims, 15 Drawing Sheets

(56) References Cited

U.S. PATENT DOCUMENTS

| | | |
|---|---|---|
| 9,359,067 B2 | 6/2016 | Fucke et al. |
| 9,678,507 B1 | 6/2017 | Douglas et al. |
| 9,679,490 B2 | 6/2017 | Ceribelli et al. |
| 9,688,403 B2 | 6/2017 | Winn et al. |
| 9,938,008 B2 * | 4/2018 | Stabler ............... G05B 23/0286 |
| 9,944,404 B1 | 4/2018 | Gentry |
| 10,011,247 B2 | 7/2018 | Joao |
| 10,328,805 B1 | 6/2019 | Wyrobek et al. |
| 2003/0016130 A1 | 1/2003 | Joao |
| 2003/0206102 A1 | 11/2003 | Joao |
| 2003/0207164 A1 * | 11/2003 | McElroy ............... B64D 27/24 244/30 |
| 2003/0234320 A1 * | 12/2003 | Colting ............... B64B 1/02 244/96 |
| 2008/0101078 A1 | 5/2008 | Stokes |
| 2011/0071706 A1 | 3/2011 | Crumm et al. |
| 2011/0071707 A1 | 3/2011 | Crumm et al. |
| 2013/0082149 A1 | 4/2013 | Boucaud et al. |
| 2013/0261914 A1 | 10/2013 | Ingram et al. |
| 2013/0325212 A1 | 12/2013 | Wickman |
| 2014/0269811 A1 | 9/2014 | Maleki et al. |
| 2014/0288730 A1 | 9/2014 | Fucke et al. |
| 2015/0115108 A1 | 4/2015 | Benson et al. |
| 2015/0158392 A1 | 6/2015 | Zhao |
| 2015/0191162 A1 | 7/2015 | Dao et al. |
| 2015/0225081 A1 * | 8/2015 | Stabler ............... G05D 1/0088 701/3 |
| 2015/0323930 A1 | 11/2015 | Downey et al. |
| 2015/0336671 A1 | 11/2015 | Winn et al. |
| 2016/0090184 A1 * | 3/2016 | Ghoshal ............... H02S 10/30 136/205 |
| 2016/0221683 A1 | 8/2016 | Roberts et al. |
| 2016/0284221 A1 | 9/2016 | Hinkle et al. |
| 2017/0039861 A1 | 2/2017 | Ceribelli et al. |
| 2017/0075360 A1 | 3/2017 | Von Novak |
| 2017/0225781 A1 | 8/2017 | Almasoud |
| 2018/0143627 A1 | 5/2018 | Lee et al. |

FOREIGN PATENT DOCUMENTS

| | | |
|---|---|---|
| CN | 103605369 A | 2/2014 |
| CN | 103701163 A | 4/2014 |
| CN | 203601033 U * | 5/2014 |
| CN | 203601033 U | 5/2014 |
| CN | 104981748 A | 10/2015 |
| CN | 105093130 A * | 11/2015 |
| CN | 105093130 A | 11/2015 |
| CN | 105247593 A | 1/2016 |
| CN | 105334865 A | 2/2016 |
| CN | 105517666 A | 4/2016 |
| CN | 105549599 A | 5/2016 |
| CN | 105576323 A * | 5/2016 |
| CN | 105576323 A | 5/2016 |
| WO | 2016154947 A1 | 10/2016 |

* cited by examiner

OPERATIONAL PARAMETER BASED FLIGHT RESTRICTION

CROSS-REFERENCE TO RELATED APPLICATIONS

This application is a continuation of U.S. Patent App. Pub. Ser. No. 16/205,476, file on Nov. 30, 2018, which is a continuation of International Application No. PCT/CN/2016/083975, filed on May 30, 2016, the entire contents of both of which are incorporated herein by reference.

BACKGROUND

Aerial vehicles have a wide range of real-world applications including surveillance, reconnaissance, exploration, logistics transport, disaster relief, aerial photography, large-scale agriculture automation, live video broadcasting, etc. Increasingly, an aerial vehicle carrying a payload (e.g., a camera) may be required to be able to complete a broad variety of operations. In some instances, it may be desired or necessary to run the variety of operations in unfavorable or even extreme environments. The usefulness of aerial vehicles may be improved by taking into account the environments and/or monitoring an internal state of the aerial vehicles and allowing operation of the aerial vehicles that appropriately take into account various circumstances.

SUMMARY

Presently, unmanned aerial vehicles (UAV) may be allowed to operate without properly taking into account a totality of circumstances affecting operation of the UAVs. For example, while factors external to the UAV such as designated flight restriction zones or objects may limit operation of the UAV, factors affecting operation of the UAV may not be properly taken into account. In some instances, UAVs may be allowed to operate without properly taking into account UAV conditions which may adversely affect operation of the UAVs due to a mismatch between operations that are permitted and operations capable of being undertaken by the UAV. For example, UAV actions that may lead to over-discharging of the battery may be permitted despite presenting a risk for loss of control or crashing of the UAV.

Accordingly, a need exists for a UAV system that appropriately takes into account a variety of factors, including operational factors that affect operation of the UAV. For example, parameters related to an energy source or power supplied to the UAV, such as a battery of the UAV, may be monitored and considered in permitting or barring certain UAV operations. A variety of parameters may be monitored and UAV operations that are allowed may dynamically change depending on the UAV's internal state. In some instances, environmental conditions may serve as a proxy to the internal state of the UAV, and the system may utilize the environmental conditions in matching the internal state of the UAV to its permitted operations. An appropriate matching of the internal state of the UAV to permitted operations may lead to a more reliable and efficient UAV performance and improved functionality.

Thus, in one aspect, a system for operating a vehicle is provided. The system comprises: one or more processors, individually or collectively configured to: receive a parameter regarding operation of the vehicle; process the parameter regarding operation of the vehicle; and vary a restriction affecting operation of the vehicle based on the processing of the parameter.

In another aspect, an unmanned aerial vehicle (UAV) is provided. The UAV comprises: one or more propulsion units that effect flight of the UAV; and one or more processors, individually or collectively configured to: receive a parameter regarding operation of the UAV; process the parameter regarding operation of the UAV; and vary a restriction affecting operation of the UAV based on the processing of the parameter.

In another aspect, a method for operating a vehicle is provided. The method comprises: with aid of one or more processors, individually or collectively, receiving a parameter regarding operation of the vehicle; processing the parameter regarding operation of the vehicle; and varying a restriction affecting operation of the vehicle based on the processing of the parameter.

In another aspect, a non-transitory computer readable medium for operating a vehicle is provided. The non-transitory computer readable medium comprises code, logic, or instructions to: receive a parameter regarding operation of the vehicle; process a parameter regarding operation of the vehicle; and vary a restriction affecting operation of the vehicle based on the processing of the parameter.

In another aspect, a system for operating a vehicle is provided. The system comprises: a first temperature sensor located at a first location configured to measure a first temperature; a second temperature sensor located at a second location configured to measure a second temperature; one or more processors, individually or collectively configured to: receive information regarding the first temperature and/or the second temperature; process the information; and impose a restriction affecting operation of the vehicle based on the processed information.

In another aspect, an unmanned aerial vehicle (UAV) is provided. The UAV comprises: one or more propulsion units that effect flight of the UAV; a first temperature sensor located at a first location configured to measure a first temperature; a second temperature sensor located at a second location configured to measure a second temperature; one or more processors, individually or collectively configured to: receive information regarding the first temperature and/or the second temperature; process the information; and impose a restriction affecting operation of the vehicle based on the processed information.

In another aspect, a method for operating a vehicle is provided. The method comprises: measuring, with aid of a first temperature sensor located at a first location, a first temperature; measuring, with aid of a second temperature sensor located at a second location, a second temperature; and with aid of one or more processors, individually or collectively, receiving information regarding the first temperature and/or the second temperature; processing the information; and imposing a restriction affecting operation of the vehicle based on the processed information.

In another aspect, a non-transitory computer readable medium for operating a vehicle is provided. The non-transitory computer readable medium comprises code, logic, or instructions to: receive information regarding a first temperature measured at a first location and/or a second temperature measured at a second location; process the information; and impose a restriction affecting operation of the vehicle based on the processed information.

In another aspect, a system for operating of a vehicle is provided. The system comprises: a sensing system configured to measure two or more parameters associated with operation of the vehicle; and one or more processors, individually or collectively configured to: receive information regarding the two or more parameters associated with operation of the vehicle, wherein each of the two or more parameters are associated with a corresponding weight; process the received information; determine a restriction based on the processed information; and impose the restriction affection operation of the vehicle.

In another aspect, an unmanned aerial vehicle (UAV) is provided. The UAV comprises: one or more propulsion units that effect flight of the UAV; a sensing system configured to measure two or more parameters associated with operation of the UAV; and one or more processors, individually or collectively configured to: receive information regarding the two or more parameters associated with operation of the UAV, wherein each of the two or more parameters are associated with a corresponding weight; process the received information; determine a restriction based on the processed information; and impose the restriction on the UAV.

In another aspect, a method for operating a vehicle is provided. The method comprises: measuring, with aid of a sensing system, two or more parameters associated with operation of the vehicle; with aid of one or more processors, individually or collectively, receiving information regarding the two or more parameters associated with operation of the vehicle, wherein each of the two or more parameters are associated with a corresponding weight; processing the received information; determining a restriction based on the processed information; and imposing the restriction affecting operation of the vehicle.

In another aspect, a non-transitory computer readable medium for operating a vehicle is provided. The non-transitory computer readable medium comprises code, logic, or instructions to:
receive information regarding two or more measured parameters associated with operation of the vehicle, wherein each of the two or more parameters are associated with a corresponding weight; process the received information; determine a restriction based on the processed information; and impose the restriction affecting operation of the vehicle.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems, methods, and devices provided herein can be used to improve efficiency and operational capability of aerial vehicles. For example, the systems provided herein may enable aerial vehicles to operate in unfavorable conditions with predictability and without loss of control. For example, the systems provided herein may prolong a lifetime of batteries powering the aerial vehicles. The aerial vehicles as used herein may refer to an unmanned aerial vehicle (UAV), or any other type of movable object. In some instances, a limit on operation of the aerial vehicles may be inadequate and/or fail to take into account relevant factors. For example, the limit or restrictions placed on UAVs may be limited to restriction on flight space. For example, the limit or restrictions placed on UAVs may consider only external factors such as flight restricted regions, jurisdictional rules, or objects. In some instances, flight or operations of the UAV may be allowed without taking into account an internal state of the UAV.

In some instances, restrictions may be imposed on the UAV taking into consideration not only external factors, but factors affecting an operation of the UAV itself. The factors affecting operation of the UAV may herein be referred to as operational factors or parameters. By taking into account the operational parameters, appropriate restrictions on operation of the UAV may be imposed depending on circumstances, and not just based on external objects or locations. In some instances, a plurality of operational parameters may be taken into account, given an appropriate weight and processed by one or more processors in order to determine an appropriate restriction. The operational parameters may include battery parameters operably coupled to the UAV.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
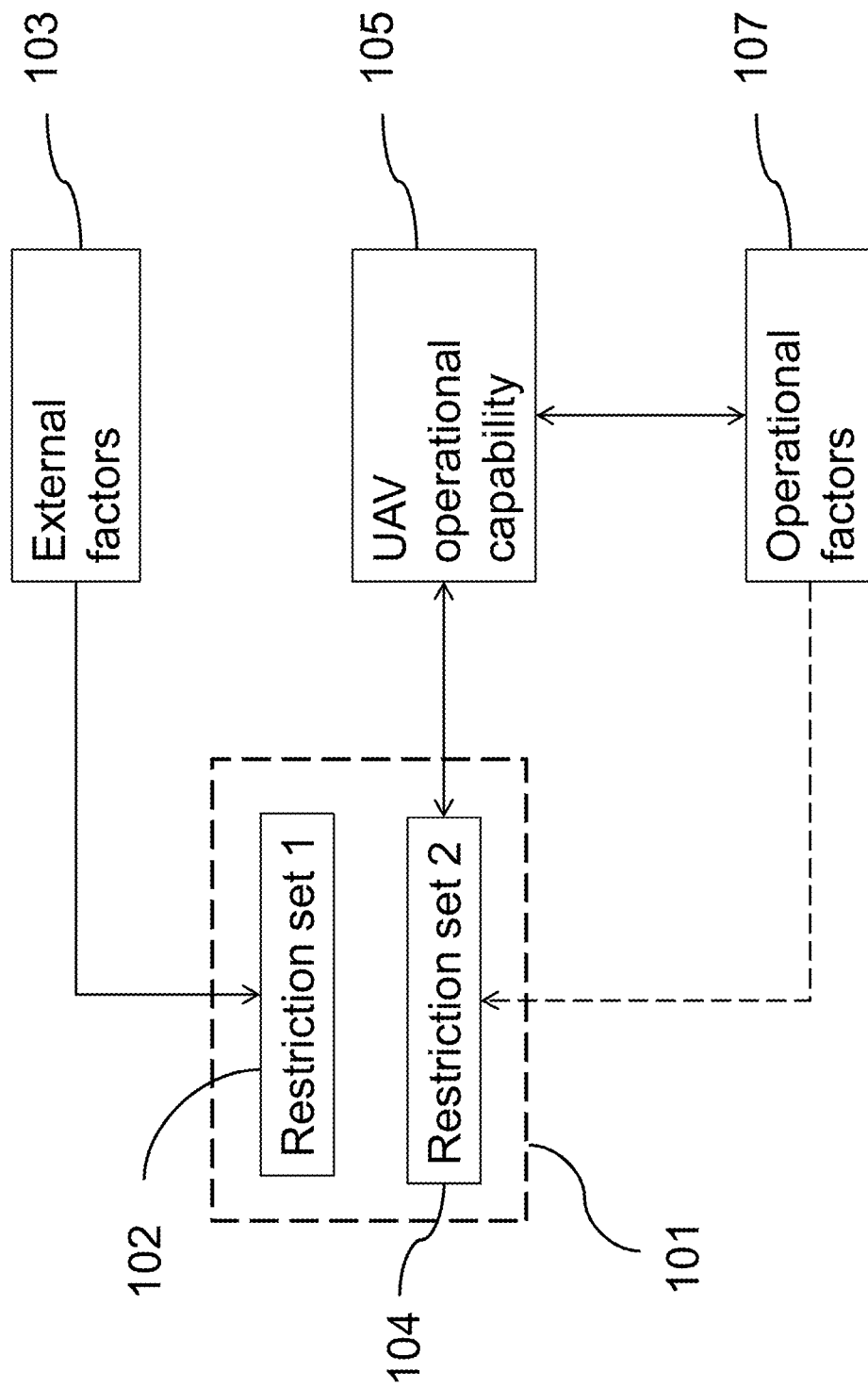
FIG. 1 illustrates factors affecting operation of an unmanned aerial vehicle (UAV), in accordance with embodiments.

FIG. 1 illustrates factors affecting operation of an unmanned aerial vehicle (UAV), in accordance with embodiments. In some instances, restrictions 101 on UAV may be imposed based on external factors 103. The external factors, also referred to herein as external parameters, may include any factor directly relating to a first restriction set 102. In some instances, the external factors may be predetermined and/or substantially static factors. In some instances, the external factors may be factors non-specific to a UAV in question and applicable to a broad variety of UAVs or other vehicles. In some instances, the external factors may not be factors affecting an operational capability of UAVs. As non-limiting examples, the external factors may include laws and regulations of a jurisdiction, information regarding flight restricted regions, external objects, etc. For example, the restriction may be an altitude restriction and the external factor may be altitude restrictions imposed on UAVs in accordance with jurisdictional rules. As another example, the restriction may be a flight prohibition near an airport and the external factor may be laws regarding flight restriction within a vicinity of an airport.

The external factors may comprise information that is preloaded onto the UAV or downloaded from a database. For example, information regarding flight restricted regions may be preloaded on the UAV and/or downloaded from an online server and be used to restrict flight of the UAV. In some instances, the external factors may be provided by appropriate users. For example, flight restriction regions may be designated by appropriate personnel or an airspace where flight is allowed may be prescribed by the user. In some instances, external factors may be sensed by one or more sensors in association with the UAV. For example, the UAV may comprise imaging sensors and/or proximity sensors that are able to detect animate and/or inanimate objects.

The external factors may be processed or utilized in restricting a three dimensional space in which flight of the UAV is allowed. For example, the UAV may be prevented from entering a prohibited airspace (e.g., as prescribed by regulations of a country) or from coming too close to an external object. In some instances, the external factors may be utilized in prescribing an operation of the UAV near a relevant airspace. For example, the UAV may be forced to fly under a certain velocity within a prescribed airspace.

In some instances, a UAV may be more efficiently and/or appropriately operated if restrictions 101 are imposed taking into account an operational capability 105 of the UAV. An operational capability of the UAV may differ at any given instance depending on a variety of other factors 107. If an operational capability of the UAV at a given moment is not considered in imposing restrictions, a mismatch may exist between what the UAV is permitted to do (e.g., as determined by restrictions 101) and what the UAV is capable of doing (e.g., as determined by UAV operational capability 105). In some instances, the mismatch between what the UAV is permitted to do and what the UAV is capable of doing may lead to unpredictability, unanticipated behavior, loss of control, or even crashing of the UAVs.

The other factors, also referred to herein as operational factors 107 may indirectly or directly affect a UAV's operational capability. In some instances, the operational factors may comprise environmental conditions, such as weather conditions. The environmental conditions may be environmental conditions surrounding, or around a vicinity of, the UAV. The environmental conditions may include, but are not limited to a wind speed, temperature, humidity, precipitation, pressure, etc around a vicinity of the UAV. The environmental conditions may directly and/or indirectly affect an operational capability of the UAV. The environmental conditions may also be referred to herein as environmental parameters.

For example, wind speed above a threshold level may make it such that propulsion mechanisms of the UAV are unable to provide sufficient thrust for the UAV to fly in a predictable or intended manner. As another example, extreme temperatures may affect or even damage internal components of the UAV such that the UAV is unable to fly in a predictable or intended manner. As another example, high humidity or precipitation may disrupt certain components of the UAV (e.g., imaging sensors) from properly functioning such that the UAV is unable to fly in a predictable or intended manner.

The environmental conditions may be sensed by one or more sensors. The one or more sensors may be provided on-board the UAV. For example, temperature and humidity sensors may be provided on-board the UAV for measuring an environmental condition surrounding the UAV. Alternatively or in addition, the one or more sensors may be provided off-board the UAV. For example, temperature and humidity sensors may be provided at a remote controller or mobile device coupled to the UAV and measurements may be used as an approximation for environmental conditions surrounding the UAV. In some instances, the environmental conditions may be downloaded from an external data base. For example, the UAV or a component coupled to the UAV (e.g., controller, mobile device, etc) may be connected (e.g., via wireless connection) to an online database with information regarding environmental conditions such as temperature, wind speed, humidity, precipitation, pressure, etc. Based on the database and a location of the UAV (e.g., sensed by a GPS on board the UAV or on a controller/mobile device coupled to the UAV), a relevant environmental condition may be downloaded for processing. In some instances, the environmental conditions may be updated in real time. Alternatively or in addition, the environmental conditions may be updated at a predetermined interval. The predetermined interval may be equal or less than about 0.1 second, 0.5 second, 1 second, 2 seconds, 5 seconds, 10 seconds, 30 seconds, 1 minute, 5 minutes, 10 minutes, 30 minutes.

The sensed and/or downloaded environmental conditions may be processed and taken into consideration in order to better impose restrictions on the UAV. For example, operation of the UAV may be prevented when an environmental temperature is above and/or below a certain threshold. For example, certain autonomous operations may be prevented when a wind speed of the environment around the UAV is above a certain threshold. In some instances, a warning may be provided when a humidity or precipitation is above a certain threshold such that an operator of the UAV is aware of UAV operational capability accounting for the environmental condition. In some instances, a plurality of operational factors may be processed into imposing an appropriate restriction on the UAV as further described below. For example, a temperature, wind speed, humidity, etc may be factored in or given an appropriate weight to determine an appropriate restriction.

In some instances, the operational factors 107 may comprise UAV conditions, also referred to herein as UAV parameters. UAV conditions may comprise any number of factors related to a state of the UAV itself. Alternatively or in addition, the UAV conditions may comprise any number of factors related to a state of devices or components coupled to the UAV, e.g., factors related to a state of remote controllers or mobile devices coupled to the UAV. In some instances, the UAV may comprise replaceable or modifiable parts (e.g., UAV has a modular design) and the UAV conditions may take into account parameters related to the parts (e.g., a weight of the parts). In some instances, the UAV conditions may be associated with a year of manufacture, a weight, battery parameters, electrical connectivity, wireless connectivity, balance, temperature, or humidity of the UAV. The UAV conditions may directly and/or indirectly affect an operational capability of the UAV. In some instances, the UAV conditions may give an insight into when a user input may effect behavior of the UAV that is unpredictable or unanticipated.

For example, a heavy payload coupled to the UAV may make it such that the UAV is unable to change a direction with its maximum speed without losing its balance as compared to having a lighter payload. As another example, sporadic or weak wireless signal may make it such that the UAV is unresponsive to real time commands. As another example, affecting a change in a battery parameter of the UAV may affect operational capability of the UAV in a variety of ways, as further described below.

The UAV conditions may be sensed by one or more sensors. The one or more sensors may be provided on-board the UAV. For example, temperature and humidity sensors may be provided on-board the UAV for measuring a UAV condition. Alternatively or in addition, the one or more sensors may be provided off-board the UAV. For example, temperature and humidity sensors may be provided at a remote controller or mobile device coupled to the UAV for measuring relevant conditions of components coupled to the UAV. The sensors as referred to herein may or may not comprise discrete, or stand-alone sensors.

The sensed UAV conditions may be processed and taken into consideration in order to better impose restrictions on the UAV. In some instances, the sensed UAV conditions may be processed and taken into consideration in order to impose a second restriction set 104 on the UAV. For example, operation of the UAV may be prevented when a temperature of a battery of coupled to the UAV is above and/or below a certain threshold. As another example, certain autonomous operations may be prevented when a weight of components coupled to the UAV are above a certain threshold. In some instances, a warning may be provided when a component (e.g., sensor) coupled to the UAV is not fully functional. In some instances, a plurality of external factors may be processed into imposing an appropriate restriction on the UAV as further described below. For example, a plurality of batter parameters for the UAV may be factored in or given an appropriate weight to determine an appropriate restriction 104.

Figure 2:
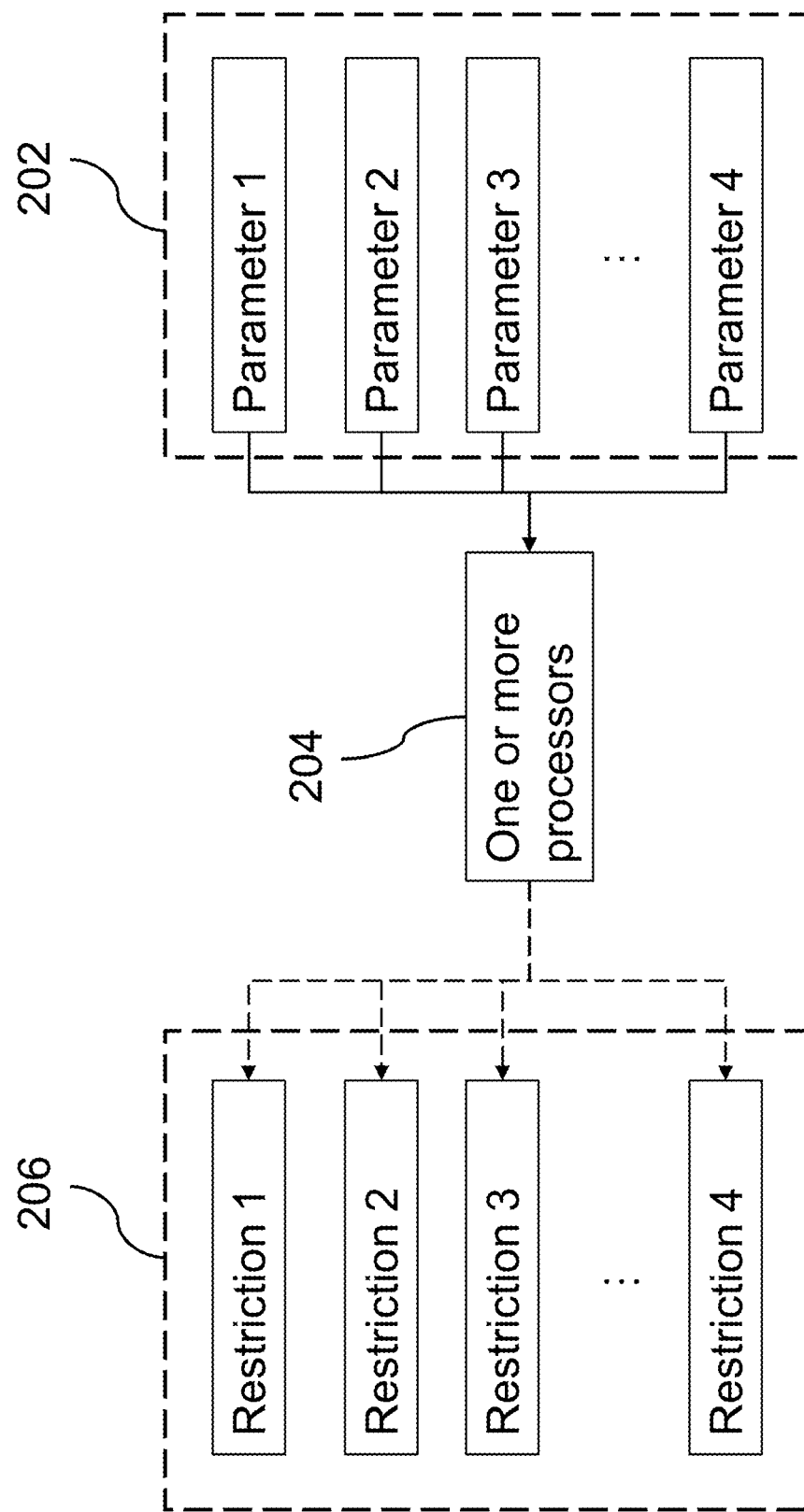
FIG. 2 illustrates a plurality of parameters taken into consideration for imposing restrictions on a UAV, in accordance with embodiments.

FIG. 2 illustrates a plurality of parameters 202 taken into consideration for imposing restrictions 206 on a UAV, in accordance with embodiments. The plurality of parameters may include external factors as well as operational factors discussed herein. For example, the plurality of parameters may comprise UAV conditions such as UAV temperature or UAV wireless signal strength, etc. As another example, the plurality of parameters may comprise environmental conditions such as weather conditions. In some instances, the plurality of parameters may comprise parameters of a battery operably coupled to the UAV as further described below. For example, the plurality of parameters may include a voltage of the battery, voltage drop of the battery, current of the battery, temperature of the battery, power of the battery, total capacity of the battery, remaining capacity of the battery, internal resistance of the battery, and/or discharge rate of the battery, amongst others.

Any number of parameters may be taken into consideration. For example, 1, 2, 3, 4, 5, 7, 10, 15, 20, or more parameters may be taken into consideration for imposing restrictions on the UAV. The plurality of parameters 202 may represent all parameters that potentially are taken into consideration for imposing restrictions on the UAV. Not all parameters necessarily must be taken into consideration for actually imposing the restrictions. In some instances, depending on circumstances, different subsets of the plurality of parameters may be taken into consideration for imposing restrictions on the UAV. The circumstances may include, but are not limited to, environmental conditions (e.g., temperature) and UAV state such as a position, orientation, velocity, or acceleration of the UAV, or an operational mode the UAV is operating in. The different operational modes may include, but are not limited to, a normal mode, idle mode, manual mode, semi-autonomous mode, autonomous mode, sport mode, or power-saving mode. For example, in a sport mode, the UAV may go faster or change directions with greater responsiveness but with less obstacle avoidance capabilities. As another example, the UAV may be operable in a power-saving mode which is configured to extend a duration of use of the UAV.

For example, a different subset of the parameters 202 may be considered (e.g. by the one or more processors 204) depending on whether the UAV is on the ground or in flight, depending on whether the UAV is flying above or below a certain velocity or acceleration, or depending on an operational mode of the UAV. In some instances, a first subset of the parameters may be taken into consideration for imposing a first restriction on a UAV while a different second subset of the parameters may be taken into consideration for imposing a second restriction on the UAV.

The plurality of parameters may be processed by one or more processors 204. The one or more processors may be provided on-board the UAV. Alternatively or in addition, the one or more processors may be provided off-board the UAV. The one or more processors may, individually or collectively, process the plurality of parameters to impose one or more restrictions 206. In some instances, the one or more processors may take into consideration the plurality of parameters (e.g., UAV parameters) and impose restrictions such as to ensure that the UAV remains operational and operates in a predictable or intended manner under non-ideal conditions. In some instances, the one or more processors may take into consideration the plurality of parameters (e.g., UAV parameters) and impose restrictions such as to match an operation that is permitted for the UAV to an operation that the UAV is capable of performing.

The processing may be accomplished in real time. Alternatively, the processing may be done at a predetermined interval. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds. The processing may involve evaluating the parameters in any appropriate way to determine one or more restrictions to impose, e.g. using tables, curves, functions, equations, etc. In some instances, the processing may involve processing the parameters to an appropriate value for further processing. For example, the processing may involve inputting the parameters into an equation or a function and determining an output. For example, the processing may involve matching the parameters to one or more outputs according to a table or a curve. The output may be further processed, e.g. using tables, curves, functions, equations, etc. For example, the output may be weighted and a weighted sum of the output may be compared against one or more predetermined values to determine an appropriate restriction to impose. In some instances, the output may comprise a coefficient that is unit-less. The processing into an output (e.g. coefficient) may provide a convenient way to process a plurality of different sensed parameters each with potentially different measuring units. While exemplary modes of processing the parameters are provided, it is to be understood that other ways of processing the parameters and imposing appropriate restrictions may be contemplated.

In some instances, how the parameters are processed by the one or more processors may change depending on circumstances. The circumstances may include, but are not limited to, environmental conditions (e.g., temperature) and UAV state such as a position, orientation, velocity, or acceleration of the UAV or an operational mode the UAV is operating in (e.g., manual mode, semi-autonomous mode, autonomous mode, etc). For example, a different table, function, equation, or curve may be utilized for processing depending on whether the UAV is on the ground or in flight, depending on whether the UAV is flying above or below a certain velocity or acceleration, depending on an operational mode of the UAV, etc.

The one or more restrictions may be restrictions on an operation of the UAV. The one or more restrictions may be internal UAV restrictions. In some instances, the one or more restrictions may prescribe operation of the UAV such that the UAV is forced to perform below its limits, capability, or default values. For example, the one or more restrictions may comprise a restriction on a velocity, angular velocity, acceleration, angular acceleration, deceleration, angular deceleration, permitted range, and/or permitted altitude of the vehicle. In some instances, the one or more restrictions may comprise a restriction that prevents the vehicle from performing a task. For example, the one or more restrictions may prevent taking-off of the UAV. As another example, the one or more restrictions may prevent the UAV from entering an autonomous operational mode. The autonomous operational mode may include, but are not limited to, warming up, waypoint flight, tracking mode, autonomous return, and/or autonomous landing. In some instances, the one or more restrictions may comprise a restriction that forces the vehicle to perform a task. For example, the one or more restrictions may force a return of the UAV or a landing of the UAV. As another example, the one or more restrictions may force the UAV to enter an autonomous operational mode. The autonomous operational mode may include, but are not limited to, warming up, waypoint flight, tracking mode, autonomous return, and/or autonomous landing. The warm up mode may be configured to make one or more motors of the vehicle spin such that the vehicle warms up. In some instances, the task may be providing a warning signal. The warning signal may be a visual, auditory, or haptic warning signal.

In some instances, the one or more restrictions may comprise a restriction that attenuates a user input. For example, a same user input given by the user may have an attenuated effect on the UAV under a restriction as compared to a UAV under no restriction. In some instances, a user input may be received on a controller or mobile device operably coupled to the UAV. For example, a user may actuate a flight control stick on a controller to control a position, orientation, velocity, and/or acceleration of the UAV. As another example, a user may touch a screen (e.g. touch screen) of a mobile device to provide a navigational command that affects a position, orientation, velocity, and/or acceleration of the UAV. As another example, a user may utilize one or more sensors on board the controller or mobile device (e.g. IMU sensors, microphone, vision sensor, etc) to provide a navigational command that affects a position, orientation, velocity, and/or acceleration of the UAV.

Under no restriction, a user input may affect a position, orientation, velocity, and/or acceleration of the UAV by a predetermined amount. A same user input given by the user may have an attenuated effect on the UAV under a restriction as compared to a UAV under no restriction. In some instances, a same user input given by the user may be received by one or more processors on board the UAV as if a lesser degree of user input had been given. For example, one or more processors off-board the UAV (e.g. processors of a remote control) may process the received input and transmit signals to the UAV as if a lesser degree of user input had been given. Alternatively or in addition, the UAV (e.g. one or more processors on board the UAV) may receive the user input as if a normal degree of user input had been given and process it such that it is as if a lesser degree of user input had been given.

The attenuation may affect any operational characteristic of the UAV. For example, the attenuation may affect an acceleration (e.g. linear and/or angular acceleration) of the UAV. For example, the attenuation may affect a velocity (e.g. linear and/or angular velocity) of the UAV. In some instances, the attenuation may affect (e.g. increase or decrease) a radius of curvature of the UAV in a turn. As an example, fully actuating a control stick (e.g. forward) may send a navigational command to the UAV to undergo a first acceleration and eventually reach a first velocity under no restrictions. This may happen for example, as actuation level of the control stick is received by a remote control that generates and/or transmits a signal to a flight control located on the UAV. The flight control may in turn generate and/or transmit one or more signals to an ESC controller coupled to propulsion units (e.g. motors) of the UAV affecting its velocity and/or acceleration. However, under one or more restrictions 206, a same user input (e.g. full actuation of the control stick) may compel the UAV to undergo a second acceleration and eventually reach a second velocity. In some instances, the second acceleration may be less than the first acceleration. In some instances, the second acceleration may be less than the first acceleration.

In some instances, the degree of attenuation may depend on an operational mode of the UAV. For example, under sport mode, a same restriction may have less effect on the UAV as compared to the same restriction on the UAV operating in a normal mode. As another example, a same restriction may have greater effect on the UAV under power-saving mode as compared to the same restriction on the UAV operating in a normal mode.

The restrictions 206 imposed on the UAV may change depending on changing circumstances. As previously described herein, each of the parameters 202 themselves may change and/or how the parameters are processed may change depending on circumstances. For example, battery parameters of the UAV may change during its operation. As another example, which subset of the parameters 202 are processed and/or how they are processed may change during the UAV's operation. Accordingly, restrictions imposed on the UAV may change while the UAV remains in substantially the same location or area. In some instances, restrictions imposed on the UAV may change while the UAV is turned on, or operational.

As a non-limiting example, each of the plurality of parameters 202 may be processed by the one or more processors 204 into a corresponding output. The correspondence between the output and the parameter may be defined by any relationship or rule. For example, the correspondence may be described by curves, equations (e.g., functions), tables, e.g. as illustrated in FIGS. 5-9 below. The output may comprise a coefficient that is unit-less, substantially as described above. Each of the output may further have a corresponding weight or value associated with it. The corresponding weight may be representative of an influence the parameter has on an operational capability of the UAV. A corresponding weight or value may be a predetermined or static value. Alternatively, a corresponding weight or a value may be a dynamically changing value. For example, the corresponding weight or value may change depending on environmental conditions (e.g., temperature), UAV state (e.g. a position, orientation, velocity, or acceleration of the UAV), or an operational mode the UAV is operating in (e.g., manual mode, semi-autonomous mode, autonomous mode, etc).

In some instances, the one or more processors may be configured to obtain a weighted sum of the output multiplied by the corresponding weight or value. The one or more processors may be configured to further compare the weighted sum to a predetermined, or threshold value. In some instances, the weighted sum may be compared to a plurality of different threshold values. Based on the comparison, the one or more processors may impose one or more restrictions on the UAV. The processing (e.g. comparison of a weighted sum to predetermined values) and imposition of restrictions on the UAV may occur in real time, or at predetermined intervals, while the UAV is in operation. Accordingly, the restrictions on operation of the UAV may dynamically change during its operation.

For example, the UAV may be grounded. One or more processors, individually or collectively, may determine a weighted sum of the processed parameters and compare it to a threshold value. If the weighted sum is greater than the threshold value, the UAV may be allowed to take off and if less than the threshold value, the UAV may not be allowed to take off. In one example, the environment may be very cold, affecting a value of one or more parameters and a weighted sum may be determined to be less than a threshold value. Accordingly, the UAV may not be allowed to take off. In some instances, the UAV may enter, or be forced to enter, warm up mode. During warm up mode, the UAV and/or batteries of the UAV may be heated. For example, the warm up mode may be configured to make one or more motors of the vehicle spin such that the vehicle and/or its batteries warm up. Alternatively or in addition, a separate heating mechanism (e.g. conductive heating, heater, etc) may be provided for warming up the UAV and/or the batteries. Subsequently, the one or more processors may once again process a weighted sum which may be determined to be greater than the threshold value, allowing the UAV to take off. The UAV may be allowed flight without restrictions on its operation initially. After a while, environmental conditions may change (e.g. it begins snowing), or a battery capacity of the UAV may be drained, changing an operational parameter for the UAV. Accordingly, new restrictions on the UAV may be imposed during flight of the UAV.

Figure 3:
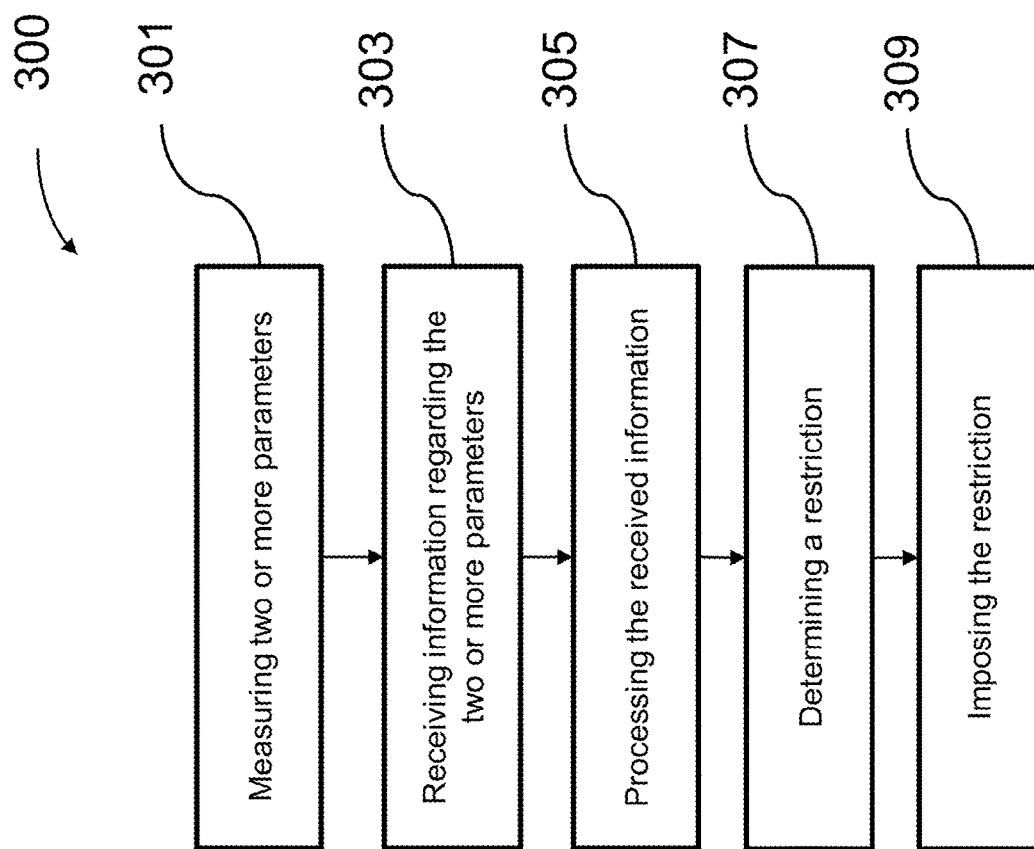
FIG. 3 illustrates a method for operating a vehicle, in accordance with embodiments.

FIG. 3 illustrates a method 300 for operating a vehicle, in accordance with embodiments. Method 300 may be an example of a method in which the devices and systems described throughout may be utilized in. In step 301, two or more parameters associated with operation of the vehicle may be measured. Each of the two or more parameters may be a parameter that directly and/or indirectly affects an operational capability of the vehicle. In some instances, the two or more parameters may comprise a vehicular parameter. The vehicular parameter may be a parameter indicating or associated with a state of the vehicle. The state may be an internal state of the vehicle and/or one or more components of the vehicle. In some instances, the vehicular parameter comprises a parameter regarding on or more batteries operably coupled to the vehicle. In some instances, the two or more parameters may comprise an environmental parameter. The environmental parameter may be a parameter of an environment around a vicinity of the vehicle. In some instances, the environmental parameter may comprise a wind speed, temperature, humidity, precipitation, and/or pressure around a vicinity of the vehicle.

In some instances, the two or more parameters may be measured with aid of a sensing system. The sensing system may be located on or off-board the vehicle. In some instances, parts of the sensing system may be located on-board the vehicle and parts of the sensing system may be located off-board the vehicle. For example, the sensing system may comprise thermistors (e.g. temperature sensors) located on-board the vehicle as well as sensors located on board a mobile device or controller coupled to the vehicle.

The two or more parameters may vary during operation of the vehicle. In some instances, the two or more parameters may vary within a continuous numerical range. For example, the two or more parameters may measure battery parameters such as voltage, voltage drop, current, power, total capacity, remaining capacity, internal resistance, discharge rate, etc of a battery operably coupled to the UAV within a continuous numerical range. In some instances, the two or more parameters may depend in part on a temperature of an environment around the vehicle. For example, some of the battery parameters (e.g. voltage, voltage drop, current, power, total capacity, remaining capacity, internal resistance, discharge rate, etc) may depend directly or indirectly on a temperature the vehicle is operating in.

While two or more parameters are described as being taken into account, it is to be understood that the number of parameters may be arbitrary. In some instances, taking into account a greater number of factors may be beneficial in appropriately matching an operational capability of the vehicle to an operation of the vehicle that is permitted. In some instances, five or more parameters associated with operation of the vehicle may be measured. The five or more parameters may include parameters of a battery operably coupled to the vehicle. For example, the five or more parameters may comprise a current, voltage, voltage drop, temperature, power, total capacity, remaining capacity, internal resistance, and/or discharge rate of a battery operably coupled to the vehicle. In some instances, the five or more parameters may comprise parameters of an environment near or around the vehicle. For example, the five or more parameters may comprise a temperature near or around the vehicle.

Steps 303~309 may be accomplished individually or collectively with aid of one or more processors. The one or more processors may be located on board the vehicle. Alternatively or in addition, the one or more processors may be located off-board the UAV and may be operatively coupled to the vehicle. For example, the one or more processors may be located on-board the UAV as well as on board a mobile device or controller coupled to the vehicle.

In step 303, information regarding the two or more parameters may be received. The information regarding the parameters may be received in real time. Alternatively, the information regarding the parameters may be received at a predetermined, or set interval. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds.

In step 305, the received information may be processed and in step 307, a restriction to impose on the vehicle may be determined. The restriction to impose may be determined based on the processing step. In some instances, steps 305 and 307 may effectively comprise a single step. For example, the restriction to be imposed on the vehicle may be determined as a result of the processing of the received information. Accordingly, processing the received information may comprise determining a restriction based on the processed information.

In some instances the received information regarding parameters may be processed into an intermediate output. The intermediate output may comprise a coefficient that is unit less. The processing into an intermediate output (e.g. coefficient) may provide a convenient way to process a plurality of different sensed parameters each with potentially different measuring units. The correspondence between the output and the parameter may be defined by any relationship or rule. For example, the correspondence may be described by curves, equations (e.g., functions), tables, etc. The information regarding the parameters and/or intermediate output may be associated with a corresponding weight. For example, a corresponding weight may be associated with each of the two or more parameters, or an intermediate (processed) output of the two or more parameters. In some instances, the one or more processors may be configured to assign a value to each of the two or more parameters or intermediate output, thereby associating the two or more parameters to the corresponding weight. For example, depending on circumstances substantially described above, the one or more processors may assign an appropriate weight to each of the two or more parameters.

In some instances, a corresponding weight associated with the two or more parameters may change depending on a state of the vehicle. The state of the vehicle may comprise different operational modes of the vehicle. The different operational modes may be modes selected by an operator of the vehicle. Alternatively or in addition, the different operational modes may comprise different autonomous modes of the vehicle. In some instances, the state of the vehicle may depend on whether the vehicle is idle, taking-off, landing, ascending, descending, accelerating, decelerating, hovering, cruising, or performing a special operation.

In some instances, a subset of the two or more parameters may be utilized to determine the restriction. The subset that is utilized may differ depending on a state of the vehicle. In some instances, the state of the vehicle may comprise different operational modes of the vehicle. The different operational modes may be modes selected by an operator of the vehicle. For example, an operator of the vehicle may select between manual, semi-autonomous, or autonomous modes. Alternatively or in addition, the different operational modes may comprise different autonomous modes of the vehicle. In some instances, the state of the vehicle may depend on whether the vehicle is idle, taking-off, landing, ascending, descending, accelerating, decelerating, hovering, cruising, or performing a special operation.

As an example, when the UAV is powered up (e.g. in an idle state) at low temperature, certain parameters may be immaterial. For example, a battery current and voltage drop may be close to zero as motors are not spinning. Therefore, the battery current and voltage drop may not be considered, or utilized to determine the restriction while other parameters may be. In some instances, a restriction may be imposed such that the UAV is prohibited from taking off and the UAV may be forced into a warm up mode. In the warm up mode, motors of the UAV may spin and the battery may be heated up such that the UAV is allowed to take off. In such cases, a notification may be sent to the user of the UAV, notifying that the UAV is ready for taking off. After the UAV takes off, parameters used to determine the restriction may be changed, e.g. more parameters may be monitored and used to determine the restriction. For example, battery parameters including voltage, voltage drop, current, temperature, remaining capacity may be utilized as further described below.

In some instances, the one or more processors may be configured to compare a sum of the parameters (or an intermediate output of the two or more parameters) multiplied by the corresponding weight to a threshold value. The comparison may affect or determine restrictions that are imposed on the vehicle. For example, different restrictions may be imposed on the vehicle depending on whether the sum is greater or less than the threshold value. In some instances, the one or more processors may be configured to compare the sum of the parameters (or an intermediate output of the two or more parameters) multiplied by the corresponding weight to two or more threshold values. Different restrictions may be imposed on the vehicle based on where the sum lies compared to the two or more threshold values.

In some instances, the restrictions to impose may be determined, or selected from a plurality of different restrictions. The plurality of different restrictions maybe predetermined restrictions that affect an operation of the vehicle, or an operative capability of the vehicle. In some instances, a subset of the plurality of different restrictions may be imposed on the vehicle. The restrictions may comprise a restriction on a velocity, angular velocity, acceleration, angular acceleration, deceleration, angular deceleration, or altitude of the vehicle. In some instances, the restrictions may prevent the vehicle from performing a task. For example, the restrictions may prevent the vehicle from taking-off. Alternatively or in addition, the restrictions may prevent the vehicle from entering an autonomous operational mode. The autonomous operational mode may include, but are not limited to, waypoint flight, tracking mode, autonomous return, or autonomous landing of the vehicle. In some instances, the restriction may force the vehicle to perform a task. For example, the restriction may force a return or landing of the vehicle. In some instances, the restriction may force the vehicle to enter an autonomous operational mode. The autonomous operational mode may include, but are not limited to, warming up, waypoint flight, tracking mode, autonomous return, and/or autonomous landing. For example, the restriction may force the vehicle to enter a warm up mode. In some instances, the restriction may affect or attenuate a user input, substantially as described above. For example, a same user input given by the user may have an attenuated effect on the vehicle under the restriction as compared to the vehicle under no restriction. In some instances, the user input may affect a change in a direction of the vehicle. Under the restriction, the change in direction of the vehicle may occur more gradually as compared to a vehicle under no restriction receiving the same input. In some instances, the user input may affect a change in a speed of the vehicle. Under the restriction, the change in speed of the vehicle may occur more gradually as compared to a vehicle under no restriction receiving the same input. In some instances, the user input may affect a change in a height of the vehicle. Under the restriction, the change in height of the vehicle may occur more gradually as compared to a vehicle under no restriction receiving the same input.

In step 309, the restriction may be imposed on the vehicle. Optionally, steps 301 through 309 may be repeated at a predetermined interval, or in real time. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds. Accordingly, the restriction imposed on the vehicle may varied dynamically, e.g. in real time or at predetermined time intervals.

In some instances, a system may be provided for implementing the method 300. All elements described in the context of methods applies to the practice of the subject systems, and vice versa. The system may comprise: a sensing system configured to measure two or more parameters associated with operation of the vehicle; and one or more processors, individually or collectively configured to: receive information regarding the two or more parameters associated with operation of the vehicle, wherein each of the two or more parameters are associated with a corresponding weight; process the received information; determine a restriction based on the processed information; and impose the restriction affection operation of the vehicle.

In some instances, a UAV may be provided for implementing the method 300. All elements described in the context of methods applies to the practice of the subject UAVs, and vice versa. The UAV may comprise: one or more propulsion units that effect flight of the UAV; a sensing system configured to measure two or more parameters associated with operation of the UAV; and one or more processors, individually or collectively configured to: receive information regarding the two or more parameters associated with operation of the UAV, wherein each of the two or more parameters are associated with a corresponding weight; process the received information; determine a restriction based on the processed information; and impose the restriction on the UAV.

In some instances, a non-transitory computer readable medium may be provided for implementing the method 300. All elements described in the context of methods applies to the practice of the subject computer readable medium, and vice versa. The non-transitory computer readable medium may comprise code, logic, or instructions to: receive information regarding two or more measured parameters associated with operation of the vehicle, wherein each of the two or more parameters are associated with a corresponding weight; process the received information; determine a restriction based on the processed information; and impose the restriction affecting operation of the vehicle.

Figure 4:
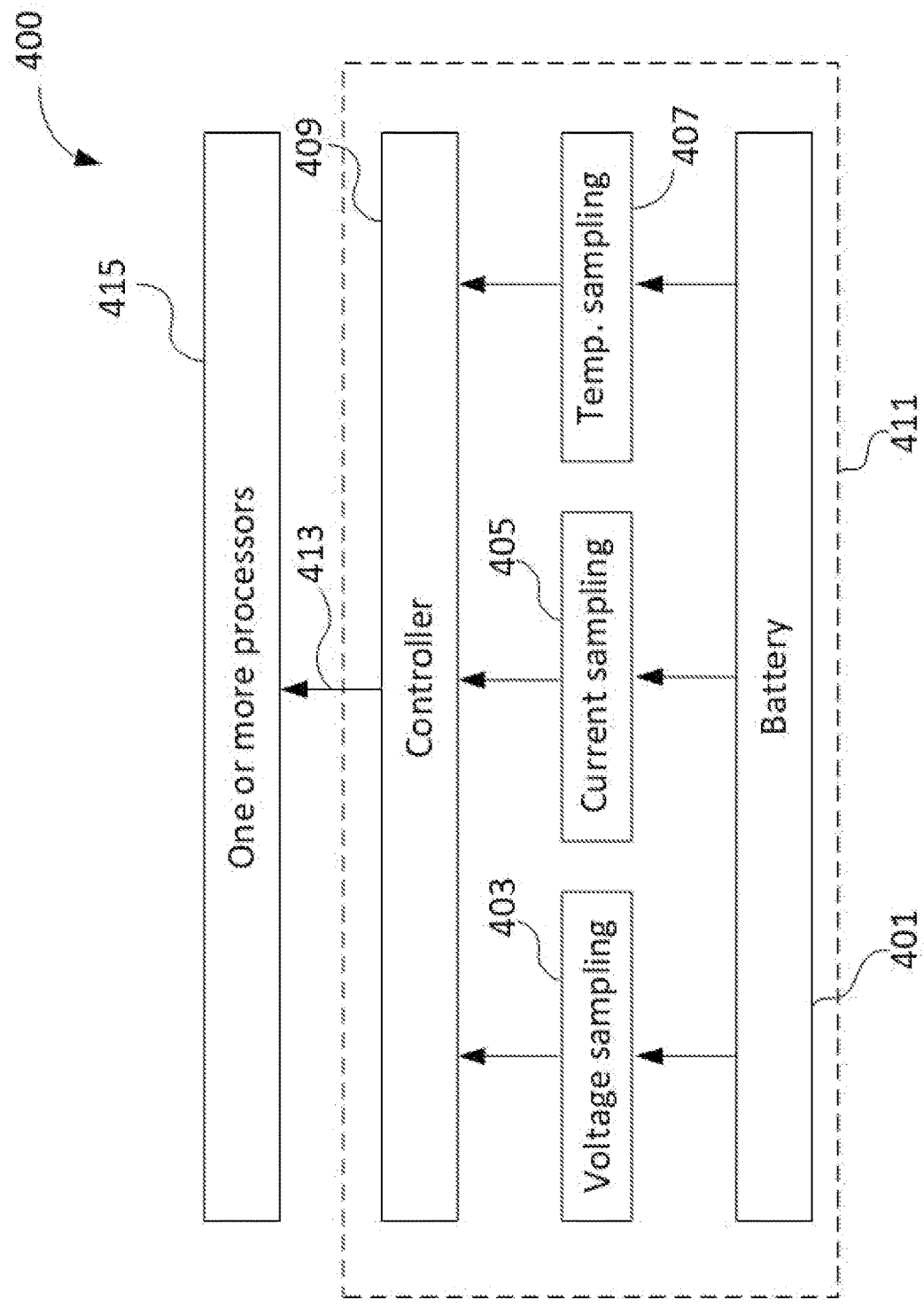
FIG. 4 illustrates a system for imposing a restriction taking into consideration battery parameters, in accordance with embodiments.

The operational parameters described herein may comprise various internal parameters of components on board the vehicle (e.g. the UAV). The components may include embedded components of the UAV (e.g. sensors, controllers, circuit boards, etc) external components, or components that can be decoupled from the UAV (e.g. payload, gimbal, etc). As a non-limiting example, a relevant component may be a battery operably coupled to the UAV. FIG. 4 illustrates a system for imposing a restriction taking into consideration battery parameters, in accordance with embodiments. The battery referred to herein may comprise single battery. Alternatively, the battery may comprise a plurality of batteries. For example, the battery may be a battery assembly (or a battery pack) and may comprise a plurality of battery cells. The battery may be integrated with the UAV. Alternatively or in addition, the battery may be a replaceable component that is removably coupled with the UAV. The battery may comprise lithium batteries, or lithium ion batteries. While batteries, or battery assemblies are primarily discussed herein, it is to be understood that any alternative power source or medium of storing energy, such as supercapacitors may be equally applicable to the present disclosure.

Parameters related to the battery may be sensed, e.g., with aid of a controller 409. The controller may be in some instances be a microcontroller located on board the battery, e.g. as part of an intelligent battery system 411. In some instances, parameters regarding the battery may be sensed by or estimated using a separate sensing means (e.g. voltmeter, multi-meter, battery level detector, etc).

In some instances, parameters relating to a voltage 403 of the battery may be sensed or sampled. Any parameter related to the voltage may be sensed or sampled. For example, an actual voltage of the battery or a voltage drop of the battery may be sensed or sampled. The voltage drop of the battery may refer to a first order derivative of the voltage over time. In some instances, parameters relating to a current 405 of the battery may be sensed or sampled. Any parameter related to the current may be sensed or sampled. For example, an actual current moving through the battery may be sensed or sampled. In some instances, parameters relating to a temperature 407 of the battery may be sensed or sampled. Any parameter related to the temperature may be sensed or sampled. For example, a temperature of the battery cell (e.g. cell temperature) may be sensed or sampled. Alternatively or in addition, a temperature of an exterior of the battery may be sensed or sampled. The temperature in some instances may be sensed with aid of a temperature sensor such as a thermistor. The temperature sensor may be located on an exterior of the battery, or in between battery cells (e.g. for a battery pack). Other battery parameters may be sensed or sampled. The other battery parameters may include, but are not limited to, a power, total capacity, remaining capacity, internal resistance, and/or discharge rate of the battery.

For a battery pack or battery assembly, the sensed parameter may be a parameter of any of the battery cells. In some instances, the sensed parameter may be an average of the sensed parameters of the battery cells. For example, a plurality of temperatures may be sensed for different battery cells of the battery pack and an average temperature may be determined and taken into consideration for further processing. In some instances, the sensed parameter may be a lowest sensed parameter or a highest sensed parameter of the battery cells. For example, a plurality of voltages may be sensed for different battery cells of the battery pack and a voltage of a cell having the lowest voltage may be taken into consideration for further processing.

The sensed or sampled parameters may be transmitted to one or more processors 415 for processing via connection 413. The connection 413 may utilize a wired or wireless communication channel. In some instances, the controller 409 may be considered part of the one or more processors substantially described throughout and may participate in processing of the parameters. The processing may involve evaluating the parameters in any appropriate way to determine one or more restrictions to impose. In some instances, each of the received or sensed parameters 403, 405, 407 may be processed into an intermediate output for further processing. The intermediate output may comprise a coefficient that is unit-less. The processing into an intermediate output (e.g. coefficient) may provide a convenient way to process a plurality of different sensed parameters each with potentially different measuring units.

Figure 5:
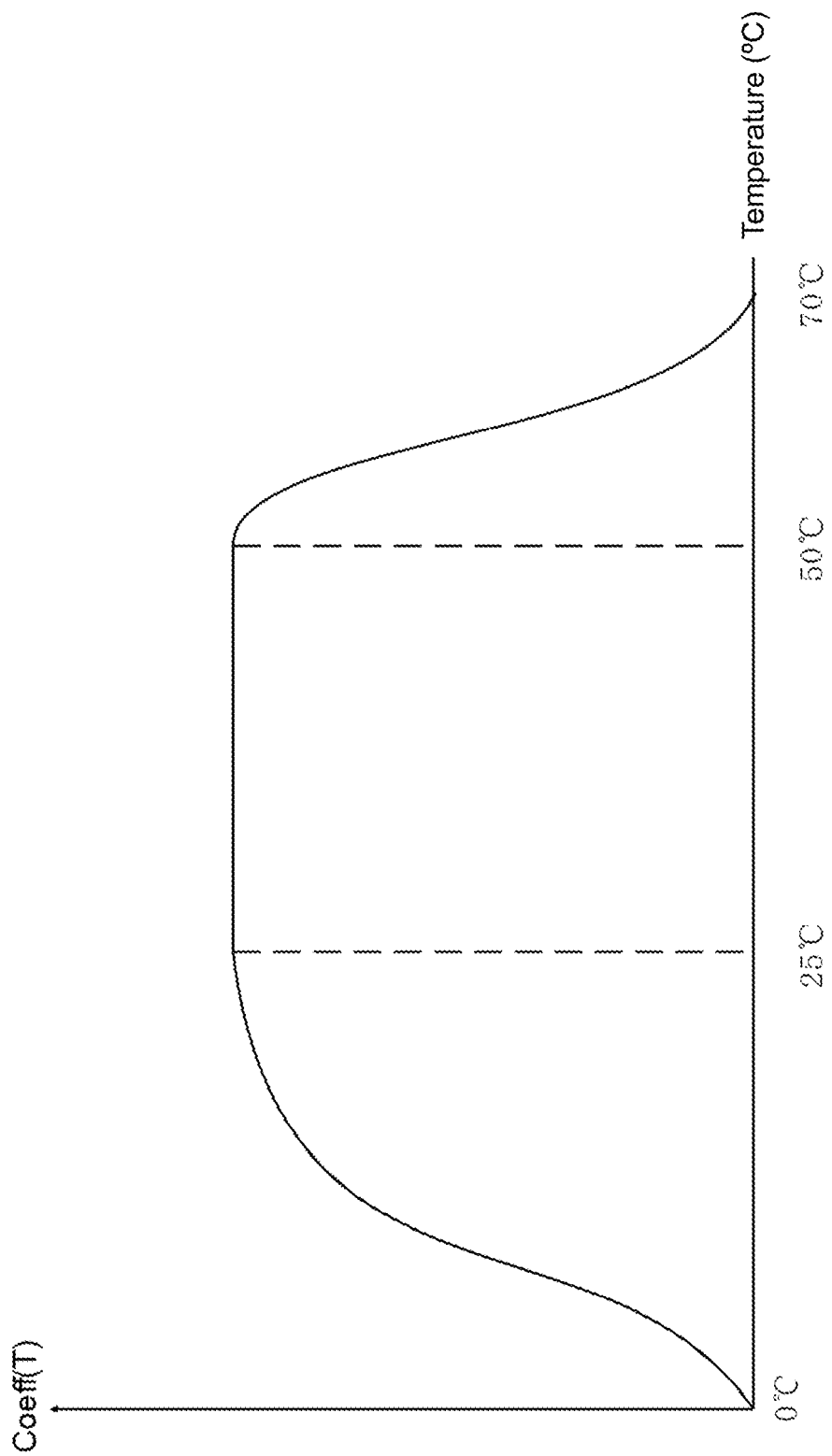
FIG. 5 illustrates a correspondence between a temperature of a battery to a temperature coefficient, in accordance with embodiments.

FIG. 5 illustrates a correspondence between a temperature of a battery to a temperature coefficient, in accordance with embodiments. While FIG. 5 shows a correspondence between a sensed temperature of a battery to a unit-less temperature coefficient defined by a curve, it is to be understood that the correspondence may be defined by any other means such as by a table, equations, functions, etc. As shown, the temperature coefficient may increase as a temperature of the battery increases up to a first threshold temperature (e.g. 25° C.) and remain substantially constant until reaching a second threshold temperature (e.g. 50° C.). Subsequently, the coefficient may decrease rapidly if the battery temperature exceeds the second threshold temperature (e.g. 50° C.). In some instances, the correspondence illustrated by FIG. 5 may signify that a restriction may apply, or may be more likely to be imposed on the UAV at very hot or very cold temperatures, e.g. if the temperature of the battery is below the first threshold temperature or above the second threshold temperature.

Figure 6:
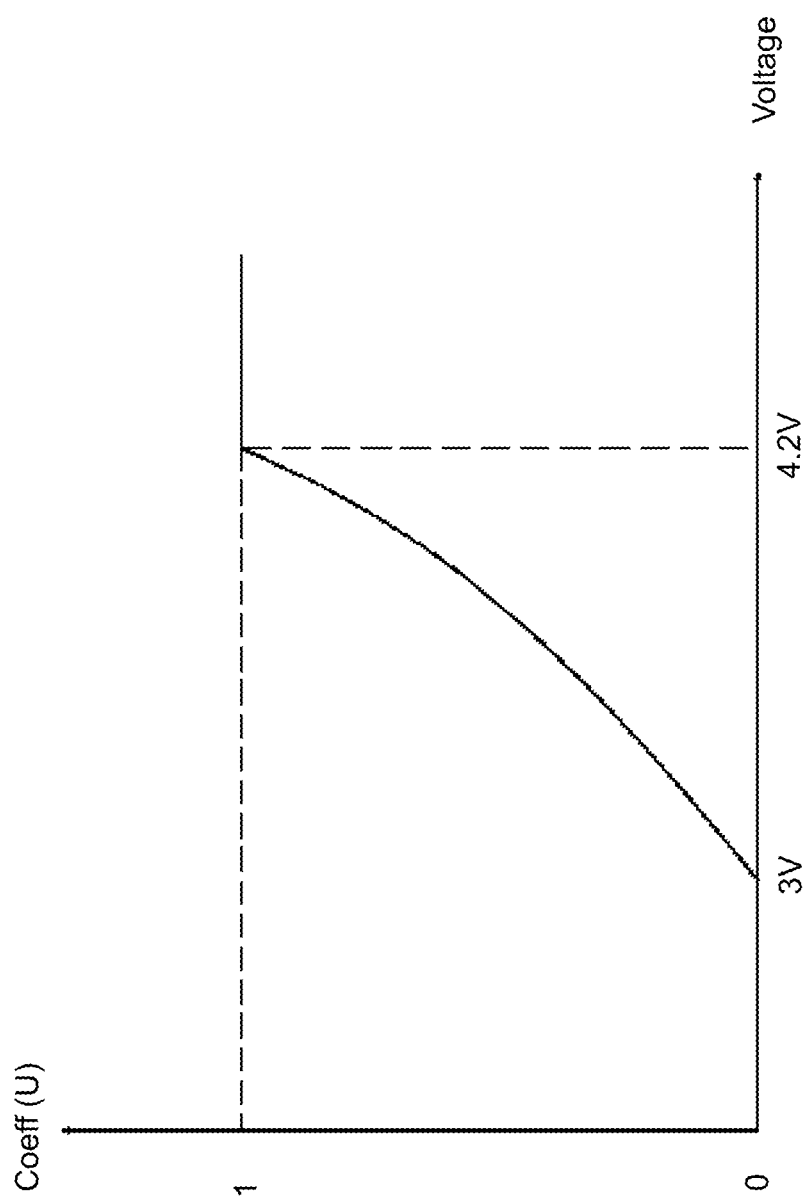
FIG. 6 illustrates a correspondence between a voltage of a battery and a voltage coefficient, in accordance with embodiments.

FIG. 6 illustrates a correspondence between a voltage of a battery and a voltage coefficient, in accordance with embodiments. While FIG. 6 shows a correspondence between a sensed voltage of a battery to a unit-less voltage coefficient defined by a curve, it is to be understood that the correspondence may be defined by any other means such as by a table, equations, functions, etc. As shown, the voltage coefficient may remain at 0 until a voltage of the battery reaches a predetermined threshold voltage (e.g. 3 V). Subsequently, the voltage coefficient may increase as the voltage increases until reaching a second threshold voltage (e.g. 4.2 V) and remain substantially constant thereafter. In some instances, the correspondence illustrated by FIG. 6 may signify that a restriction may apply, or may be more likely to be imposed on the UAV once a voltage of the battery is below a threshold voltage.

In some instances, a correspondence between battery voltage and battery temperature may be required for a UAV is allowed to take off. For example, a UAV may be allowed to take off only if both the battery temperature and battery voltage meet a minimum requirement. For example, when the battery temperature is 0° C., the minimum battery voltage required may be 4250 V. For example, when the battery temperature is 5° C., the minimum battery voltage required may be 4200 V. For example, when the battery temperature is 15° C., the minimum battery voltage required may be 4100 V. For example, when the battery temperature is 20° C., the minimum battery voltage required may be 4100 V.

Figure 7:
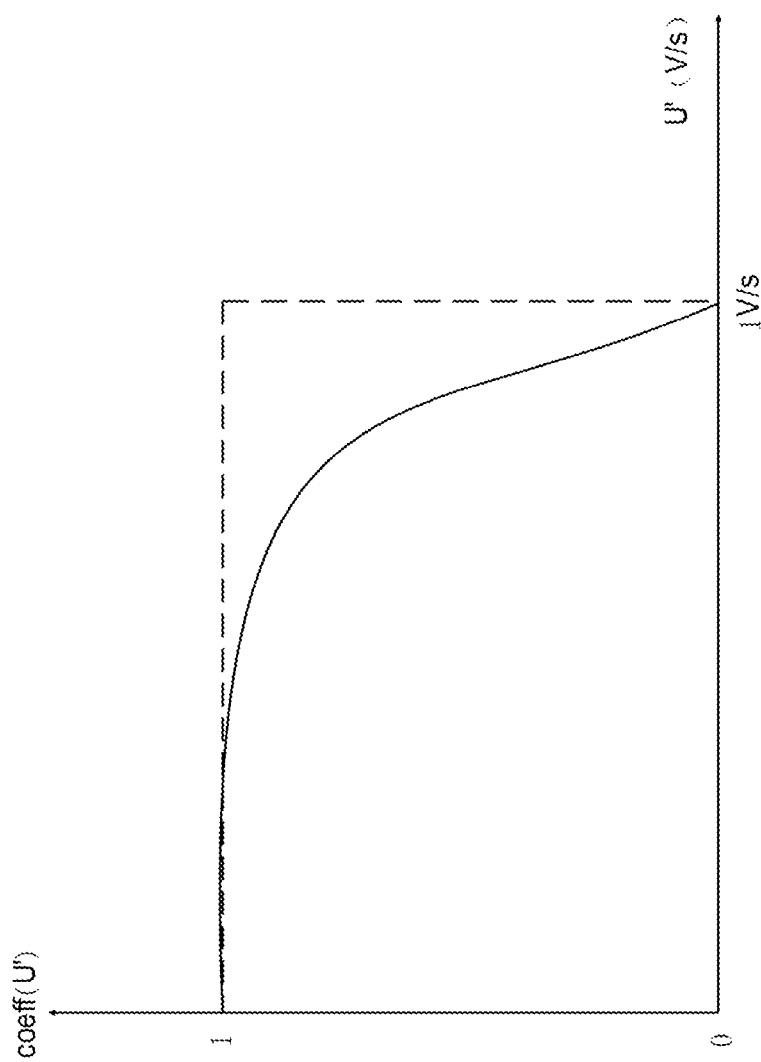
FIG. 7 illustrates a correspondence between a voltage drop of a battery and a voltage drop coefficient, in accordance with embodiments.

FIG. 7 illustrates a correspondence between a voltage drop of a battery and a voltage drop coefficient, in accordance with embodiments. While FIG. 7 shows a correspondence between a sensed voltage drop of a battery to a unit-less voltage drop coefficient defined by a curve, it is to be understood that the correspondence may be defined by any other means such as by a table, equations, functions, etc. As shown, the voltage drop coefficient may rapidly decrease to 0 as the voltage drop increases to a predetermined threshold voltage drop (e.g. 1 V/s). In some instances, the correspondence illustrated by FIG. 7 may signify that a restriction may apply, or may be more likely to be imposed on the UAV once the voltage drop of the battery is nearing a threshold value.

Figure 8:
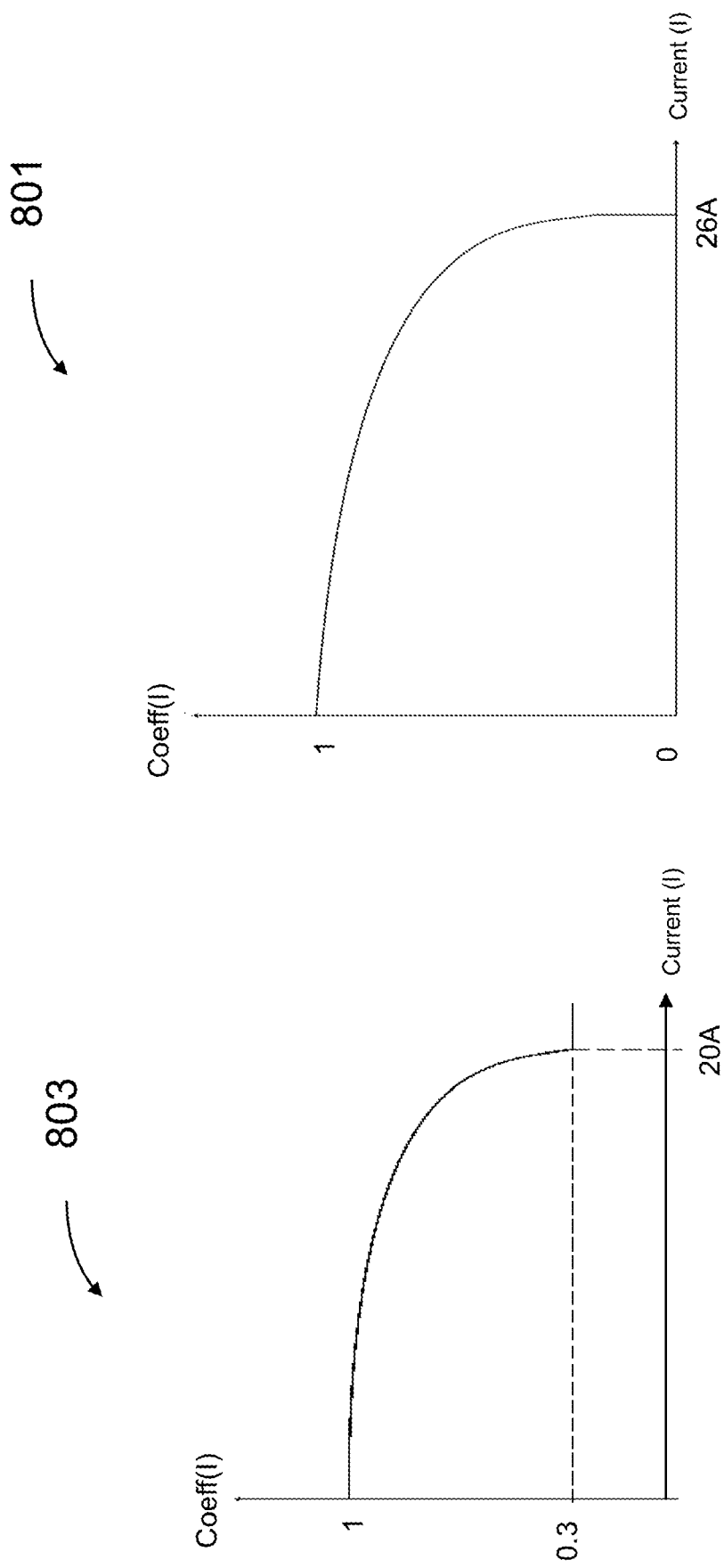
FIG. 8 illustrates a correspondence between a current of a battery and a current coefficient, in accordance with embodiments.

FIG. 8 illustrates a correspondence between a current of a battery and a current coefficient, in accordance with embodiments. While FIG. 8 shows a correspondence between a current of a battery to a unit-less current coefficient defined by a curve, it is to be understood that the correspondence may be defined by any other means such as by a table, equations, functions, etc. As shown in both embodiment 801, the current coefficient may rapidly decrease to 0 as the current increases to a predetermined threshold current (e.g. 26 A). An alternative embodiment 803 shows that in some instances, the current coefficient may rapidly decrease to a predetermined value (e.g. 0.3) as the current increases to a predetermined threshold current (e.g. 20 A) and remain at the predetermined value even if the current increases. In some instances, the correspondence illustrated by FIG. 8 may signify that a restriction may apply, or may be more likely to be imposed on the UAV once the current of the battery is nearing a threshold current.

Figure 9:
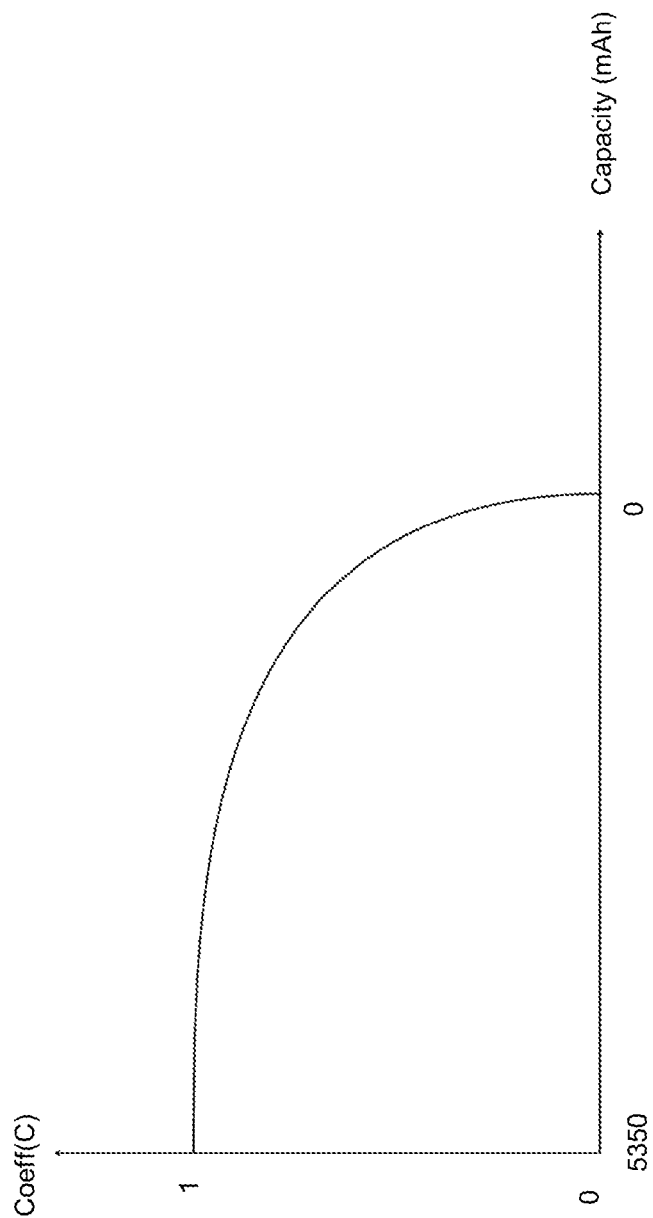
FIG. 9 illustrates a correspondence between a remaining capacity of a battery and a remaining capacity coefficient, in accordance with embodiments.

FIG. 9 illustrates a correspondence between a remaining capacity of a battery and a remaining capacity coefficient, in accordance with embodiments. While FIG. 9 shows a correspondence between a sensed remaining capacity of a battery to a unit-less remaining capacity coefficient defined by a curve, it is to be understood that the correspondence may be defined by any other means such as by a table, equations, functions, etc. As shown, the remaining capacity coefficient may rapidly decrease to 0 as the remaining capacity decreases to a predetermined capacity level (e.g. 0 mAh). In some instances, the correspondence illustrated by FIG. 9 may signify that a restriction may apply, or may be more likely to be imposed on the UAV as the remaining capacity nears depletion.

In some instances, a weighted sum of the coefficients may be calculated. The weighted sum may also be referred to herein as a final coefficient. In some instances, the final coefficient may be calculated according to the formula (1)

(1) $\text{Coeff}_{final} = a_v * \text{Coeff}_v + a_{\dot{u}} * \text{Coeff}_{\dot{u}} + a_1 * \text{Coeff}_1 + a_T * \text{Coeff}_T + a_C \text{Coeff}_C$ wherein: $\text{Coeff}_{final}$ is the weighted sum, or final coefficient; $a_v$ is the weight of voltage of the battery; $a_{\dot{u}}$ is the weight of voltage drop of the battery; $a_1$ is the weight of current of the battery; $a_T$ is the weight of temperature of the battery; $a_C$ is th weight of a remaining capacity of the battery; $\text{Coeff}_v$ is the coefficient corresponding to voltage of the battery; $\text{Coeff}_{\dot{u}}$ is the coefficient corresponding to voltage drop of the battery; $\text{Coeff}_1$ is the coefficient corresponding to current of the battery; $\text{Coeff}_T$ is the coefficient corresponding to temperature of battery; and $\text{Coeff}_C$ is the coefficient corresponding to remaining capacity of the battery. Each of the weights may represent a degree of each battery parameter influencing a flight restriction imposed on UAV's flight. In some instances, the values of weights may be predetermined.

In some instances, the values of weights may depend on environmental conditions (e.g., temperature), UAV state (e.g. a position, orientation, velocity, or acceleration of the UAV), or an operational mode the UAV is operating in (e.g., manual mode, semi-autonomous mode, autonomous mode, etc). As an example, if a motor of the UAV is not rotating (e.g. due to a low temperature environment), only the temperature and voltage of the battery may be considered, as the current and voltage drop of the battery may be very small. Accordingly, a weight of the temperature ($a_T$) and voltage ($a_v$) of the batteries may be increased, while weights of other parameters may decrease (e.g. to 0). In some instances, if the motor of the UAV is not rotating, the UAV may be configured to enter a warm up mode, substantially as described herein. As another example, if the UAV is on the ground, a weight of the temperature ($a_T$) and voltage ($a_v$) of the batteries may be increased, while weights of other parameters may decrease (e.g. to 0). As another example, if the UAV is flying above a certain threshold velocity, a voltage drop and remaining capacity of battery may be considered most important, and their corresponding weights may be increased. As another example, if the UAV is flying below a certain threshold velocity, a voltage and current of the battery may be considered most important, and their corresponding weights may be increased. As an example, a UAV may be operable in different modes. The different modes may include, but are not limited to, a normal mode, manual mode, semi-autonomous mode, autonomous mode, sport mode, or power-saving mode. For example, in a sport mode, the UAV may go faster or change directions with greater responsiveness but with less obstacle avoidance capabilities. As another example, the UAV may be operable in a power-saving mode which is configured to extend a duration of use of the UAV. In such cases, a weight of the parameters for each operational mode may be different.

The weighted sum may be compared to one or more threshold values substantially as described above and one or more restrictions may be imposed on operation of the UAV. For example, if the weighted sum becomes equal to or lower than a threshold value, the UAV may be forced to enter an autonomous mode and return to a user. As another example, if the weighted sum becomes equal to or lower than a threshold value, the UAV may be forced to enter a different operational mode (e.g. switch from normal mode to sport mode or vice versa).

Figure 10:
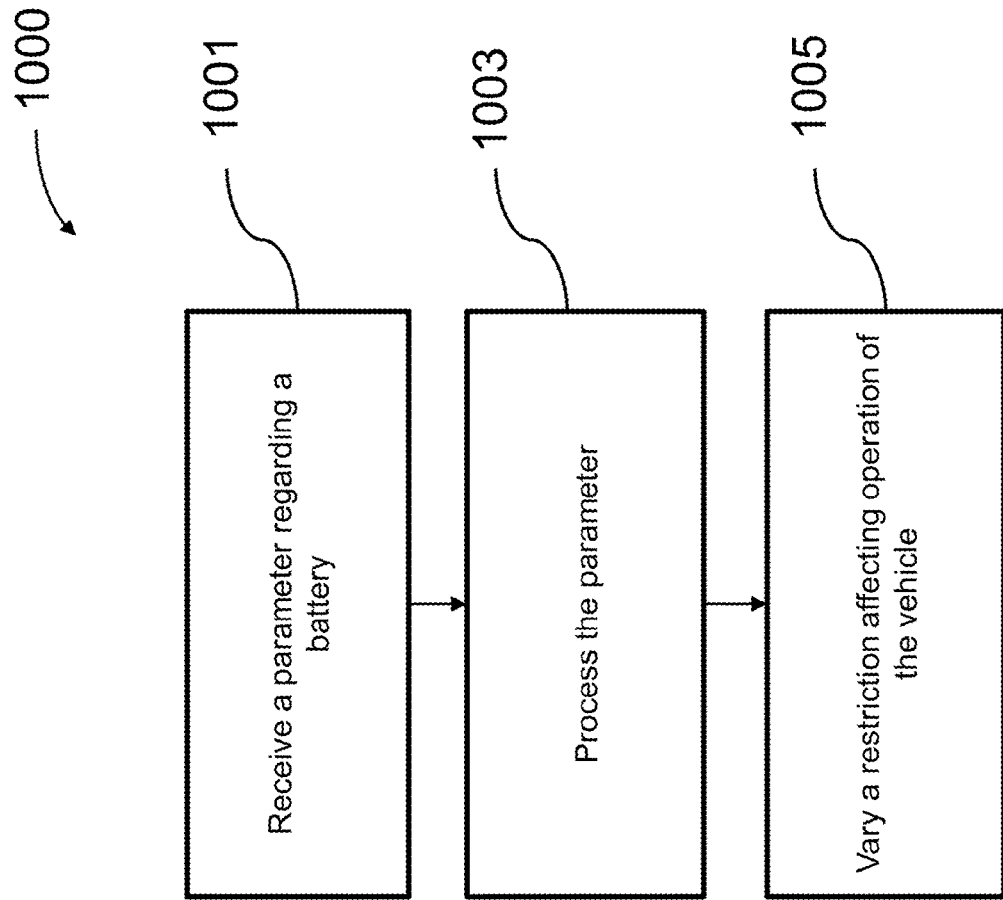
FIG. 10 illustrates a method for operating a vehicle, in accordance with embodiments.

FIG. 10 illustrates a method 1000 for operating a vehicle, in accordance with embodiments. Method 1000 may be an example of a method in which the devices and systems described throughout may be utilized in. The method 1000 may be accomplished individually or collectively with aid of one or more processors. The one or more processors may be on board the vehicle. Alternatively or in addition, the one or more processors may be operably coupled to the vehicle but may be off board the vehicle. For example, the one or more processors may be located on a controller or a mobile device coupled to the vehicle.

In step 1001, a parameter regarding an operation of a vehicle may be received. In some instances, the parameter may comprise a vehicular parameter. The vehicular parameter may be a parameter indicating or associated with a state of the vehicle. The state may be an internal state of the vehicle and/or one or more components of the vehicle. In some instances, the vehicular parameter comprises a parameter regarding on or more batteries operably coupled to the vehicle. The one or more batteries may be on board the vehicle. Alternatively or in addition, the one or more batteries may be operably coupled to the UAV but may be off board the vehicle. For example, the one or more batteries may be located on a controller or a mobile device coupled to the UAV. In some instances, the parameter comprises a plurality of different parameters regarding the battery. For example, the parameter may comprise a current, voltage, voltage drop, temperature, power, total capacity, remaining capacity, internal resistance, and/or discharge rate of the one or more batteries. The parameter regarding the one or more batteries may be received in real time. Alternatively, the parameter regarding the one or more batteries may be received at a predetermined interval. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds. In some instances, the parameter may comprise an environmental parameter. The environmental parameter may be a parameter of an environment around a vicinity of the vehicle. In some instances, the environmental parameter may comprise a wind speed, temperature, humidity, precipitation, and/or pressure around a vicinity of the vehicle.

In step 1003, the parameter regarding the operation of the vehicle may be processed. For example, parameters regarding one or more batteries may be processed. In some instances, the parameter may be processed differently by the one or more processors depending on a state of the vehicle. For example, a weight given to the parameter, substantially described herein, may differ depending on the state of the vehicle. The state of the vehicle may comprise different operational modes of the vehicle. In some instances, the different operational modes comprise modes selected by an operator of the vehicle. In some instances, the different operational modes comprise different autonomous modes of the vehicle. Alternatively or in addition, the state of the vehicle depends on whether the vehicle is idle, taking-off, landing, ascending, descending, accelerating, decelerating, hovering, cruising, or performing a special operation. Optionally, a restriction may be determined, e.g. during the step of 1003.

In step 1005, a restriction may be imposed on the vehicle based on the processing of the parameter. In some instances, the restriction imposed on the vehicle may comprise two or more different restrictions. In some instances, two or more different restriction may be imposed simultaneously on the vehicle. The restrictions may be global restrictions, e.g., without respect to a geographical location or external object. The restriction may match an operational capability of the vehicle to a permitted operation such that unpredictability of behavior is curbed. Optionally, steps 1001 through 1005 may be repeated, e.g. in real time or at predetermined intervals. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds. Accordingly, the restriction imposed on the vehicle may varied dynamically, e.g. in real time or at predetermined time intervals.

In some instances, imposing a restriction may comprise varying a restriction affecting operation of the vehicle. In some instances, varying a restriction may mean selecting between a plurality of restrictions. In some instances, the restriction imposed on the vehicle is varied in real time. For example, the restriction imposed may dynamically change any time during operation of the vehicle. For example, after continued flight in an environment (e.g. battery discharge) and/or sudden change in environment (e.g. decrease in temperature), a restriction imposed on the vehicle may change, e.g., during flight.

The restriction imposed on the vehicle may in some instances comprise a restriction on a velocity, angular velocity, acceleration, angular acceleration, deceleration, angular deceleration, or altitude of the vehicle. In some instances, the vehicle may be allowed to operate at 10%, 20%, 30%, 40%, etc of a maximum performance capability.

In some instances, the restriction imposed on the vehicle may prevent the vehicle from performing a task. The task may be taking-off of the vehicle. In some instances, the task may be entering an autonomous operational mode. The autonomous operational mode may comprise waypoint flight, tracking mode, autonomous return, and/or autonomous landing.

In some instances, the restriction imposed on the vehicle may force the vehicle to perform a task. The task may be forcing a return or forcing a landing of the vehicle. In some instances, the task may be entering an autonomous operational mode. The autonomous operational mode may include, but are not limited to, warming up, waypoint flight, tracking mode, autonomous return, and/or autonomous landing. The warm up mode may be configured to make one or more motors of the vehicle spin such that the vehicle warms up. In some instances, the task may be providing a warning signal. The warning signal may be a visual, auditory, or haptic warning signal.

In some instances, the restriction imposed on the vehicle may modify a user input. For example, while the method 1000 is taking place, the user may give an input. The user input may be provided on any input device or interface coupled to the vehicle. For example, the user input may be given on a remote controller or a mobile device coupled to the vehicle. For example, the user input may be given on one or more joysticks on the remote controller. Alternatively or in addition, the user input may be given on a mobile device. In some instances, the user input may be sensed by a sensor on board the remote controller or a mobile device. The sensor may include sensors such as an inertial measurement unit (IMU), a microphone, a camera, etc.

The user input may have a modified effect for a vehicle under restriction. For example, for a same degree of actuation (e.g. full actuation) on joysticks on the remote controller, a vehicle under restriction may behave differently from a vehicle under no restriction. In some instances, the restriction may attenuate an effect of the user input, substantially as described throughout. For example, a same user input given by the user may have an attenuated effect on the vehicle under the restriction as compared to the vehicle under no restriction. In some instances, the user input may affect a change in a direction of the vehicle. Under the restriction, the change in direction of the vehicle may occur more gradually as compared to a vehicle under no restriction receiving the same input. In some instances, the user input may affect a change in a speed of the vehicle. Under the restriction, the change in speed of the vehicle may occur more gradually as compared to a vehicle under no restriction receiving the same input. In some instances, the user input may affect a change in a height of the vehicle. Under the restriction, the change in height of the vehicle may occur more gradually as compared to a vehicle under no restriction receiving the same input.

The varying of the restriction imposed on the vehicle may prevent malfunction of the vehicle. Varying the restriction may prevent insufficient power output by one or more batteries for a given operation of the vehicle. In some instances, based on the sensed parameter, the one or more processors may determine that the vehicle cannot effectuate a user input due to insufficient power output by the one or more batteries. For example, based on the sensed parameter, the one or more processors may determine that the vehicle cannot make a sharp turn without running into power output problems. For example, based on the parameter, the one or more processors may determine that the vehicle cannot operate under certain velocities or accelerations without running into power output problems. For example, based on the parameter, the one or more processors may determine that the vehicle cannot implement certain autonomous modes without running into power output problems. Accordingly, the one or more processors may impose a restriction to match a capability of the vehicle to a permitted operation.

Varying the restriction may prevent an over-discharging of the one or more batteries during operation of the vehicle. In some instances, based on the sensed parameter, the one or more processors may determine that the vehicle cannot effectuate a user input without over discharging the battery. For example, based on the sensed parameter, the one or more processors may determine that the vehicle cannot make a sharp turn without over discharging the battery. For example, based on the parameter, the one or more processors may determine that the vehicle cannot operate under certain velocities or accelerations without over discharging the battery. For example, based on the parameter, the one or more processors may determine that the vehicle cannot implement certain autonomous modes without over discharging the battery. Accordingly, the one or more processors may impose a restriction to match a capability of the vehicle to a permitted operation.

In some instances, varying the restriction may prevent a battery protection circuit from cutting off the output of the battery. For example, a battery operably coupled to the vehicle may be configured to cut off output of the battery to prevent over-discharging of the battery. As the systems provided by the present disclosure prevent over discharging as described above by preventing vehicle activity that could over discharge the battery, use of the battery protection circuit may be limited.

In some instances, varying the restriction may prevent an unpredictable or unanticipated behavior of the UAV. In some instances, the unpredictable or unanticipated behavior is a crashing of the vehicle. In some instances, the unpredictable or unanticipated behavior is a loss of control of the vehicle. The loss of control of the vehicle may be such that the vehicle does not operate according to a user's input. In some instances, as use of the battery protection circuit may be limited, crashing of the vehicle due to circuit breaks may be prevented.

In some instances, the unpredictable or unanticipated behavior of the UAV may be a malfunction. The malfunction may be associated with environmental conditions. For example, very high and/or very low temperatures may cause malfunction of the UAV. In some instances, varying the restriction imposed on the vehicles based on the sensed parameter may prevent malfunction of the vehicles above a threshold temperature. The threshold temperature may be equal to or greater than about 50° C., 60° C., 70° C., 80° C., 90° C., or 100° C. In some instances, varying the restriction imposed on the vehicles based on the sensed parameter may prevent malfunction of the vehicles below a threshold temperature. The threshold temperature may be equal to or lower than about 0° C.

In some instances, varying the restriction imposed on the vehicle maximizes a use of the one or more batteries operably coupled to the vehicle. For example, the use of the one or more batteries may be maximized by preventing a use of the one or more batteries beyond a predetermined maximum output power. In some instances, the predetermined maximum output power may be equal to or greater than 50 W, 100 W, 200 W, 400 W, 600 W, 800 W, 1000 W, 2000 W, or 4000 W. In another example, the duration of the use of the one or more batteries may be ensured above a threshold duration. In some instances, the threshold duration is equal to or greater than 5 minutes, 7 minutes, 10 minutes, 15 minutes, 20 minutes, 25 minutes, 30 minutes, 1 hour, 2 hours, 4 hours, or 10 hours.

In some instances, a system may be provided for implementing the method 1000. All elements described in the context of methods applies to the practice of the subject systems, and vice versa. The system may comprise one or more processors, individually or collectively configured to: receive a parameter regarding one or more batteries on board the vehicle; process the parameter regarding the one or more batteries; and vary a restriction affecting operation of the vehicle based on the processing of the parameter.

In some instances, a UAV may be provided for implementing the method 1000. All elements described in the context of methods applies to the practice of the subject UAVs, and vice versa. The UAV may comprise one or more batteries on board the UAV; and one or more processors, individually or collectively configured to: receive a parameter regarding the one or more batteries on board the UAV; process the parameter regarding the one or more batteries; and vary a restriction affecting operation of the UAV based on the processing of the parameter.

In some instances, a non-transitory computer readable medium may be provided for implementing the method 1000. All elements described in the context of methods applies to the practice of the subject computer readable medium, and vice versa. The non-transitory computer readable medium may comprise code, logic, or instructions to receive a parameter regarding one or more batteries on board the vehicle; process a parameter regarding the one or more batteries; and vary a restriction affecting operation of the vehicle based on the processing of the parameter.

Substantially as described herein, gathering information or data regarding operational factors may help in imposing appropriate restrictions on the UAV. In some instances, a flight control strategy for the UAV may be better determined by taking into account different temperature measurements. The flight control strategy may involve imposing one or more restrictions on the UAV. For example, a flight control strategy may be determined based on temperature differences between a temperature of a battery operably coupled to the UAV and a temperature of the UAV. In some instances, the temperature difference may be utilized in estimating a temperature of the battery cell more accurately and for imposing appropriate restriction, substantially as described throughout.

Figure 11:
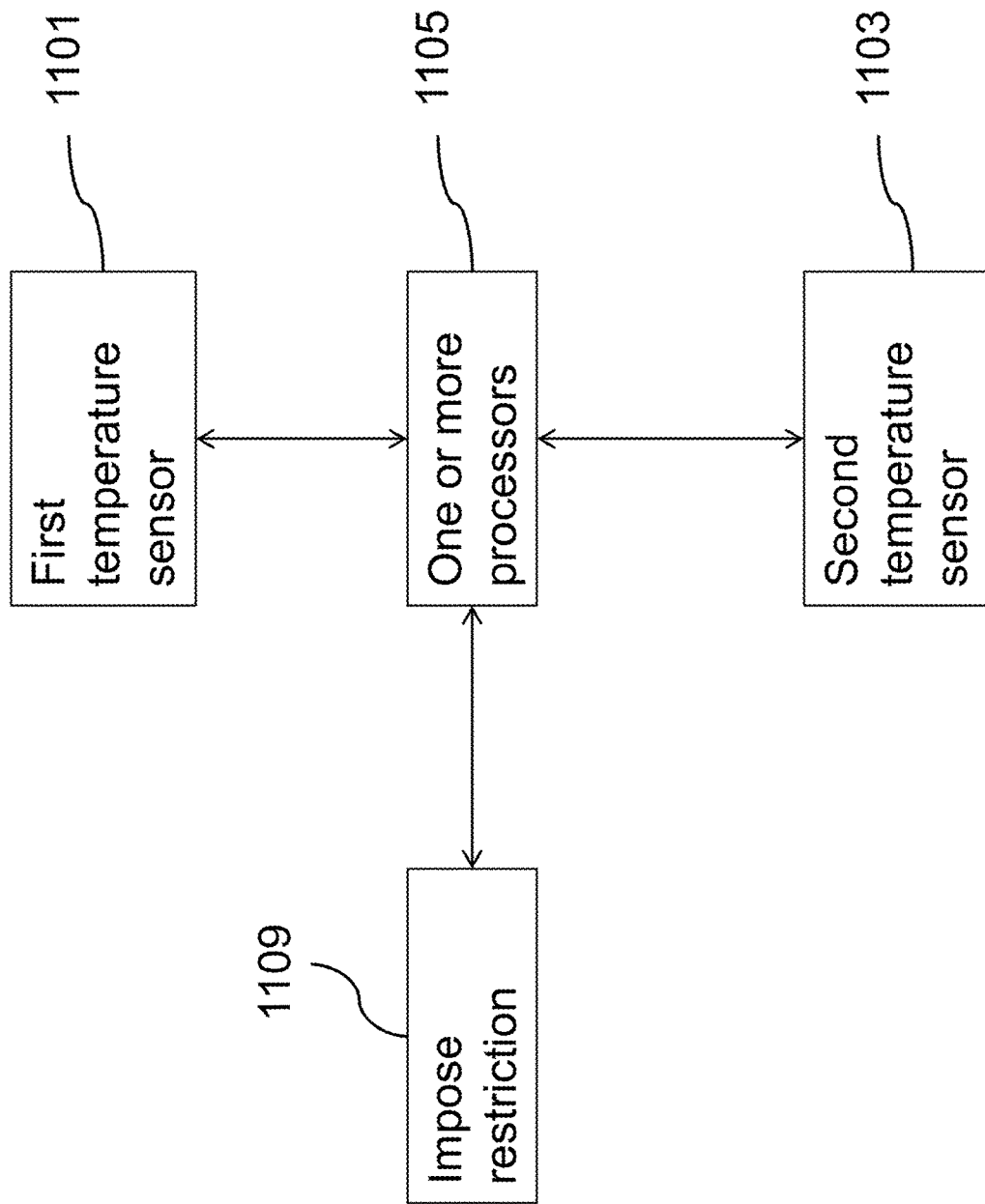
FIG. 11 illustrates a system for flight control utilizing two temperature sensors, in accordance with embodiments.

FIG. 11 illustrates a system for flight control utilizing two temperature sensors, in accordance with embodiments. The system may comprise a means to measure temperatures at two or more locations. For example, the system may comprise a means to measure a first temperature at a first location and a second temperature at a second location. In some instances, the first temperature may be a temperature of a battery. The battery may be a battery operably coupled to a UAV. For example, the battery may be a removable battery configured to be loaded onto a UAV. Alternatively, the battery may be an integrated battery located on board the UAV. In some instances, the battery may be a battery of a component operably coupled to the UAV. For example, the battery may be a battery of a payload, add-on, remote controller, mobile device, etc operably coupled to the UAV. The second temperature may be a temperature of a heat sink or heat source near the first temperature. In some instances, the second temperature may be a temperature of the environment.

In some instances, the first temperature may be measured with aid of a first temperature sensor 1101. In some instances, the first temperature sensor may be configured to measure an approximation of the first temperature. The first temperature sensor may comprise any means of measuring a temperature. In some instances, the first temperature sensor may directly measure a temperature (e.g. Celsius, Fahrenheit). Alternatively, the first temperature sensor may indirectly measure a temperature. For example, the first temperature sensor may comprise a thermistor any may indirectly measure a temperature by measuring a resistance of the thermistor. In some instances, the thermistor may be a negative temperature coefficient (NTC) thermistor.

The first temperature sensor may be located at a first location. In some instances, the first location may be on or near the battery. For example, the first temperature sensor may be located on or near an exterior of the battery, or battery pack. In some instances, the first temperature sensor may be located at a distance equal to or less than 5 cm, 4 cm, 3 cm, 2 cm, 1 cm, or 0.5 cm of an exterior of the battery. For a battery pack, the first temperature sensor may be located between battery cells of the battery pack. The first temperature sensor may be configured to approximate a temperature of the battery.

In some instances, the second temperature may be measured with aid of a second temperature sensor 1103. In some instances, the second temperature sensor may be configured to measure an approximation of the second temperature. The second temperature sensor may comprise any means of measuring a temperature. In some instances, the second temperature sensor may directly measure a temperature (e.g. Celsius, Fahrenheit). Alternatively, the second temperature sensor may indirectly measure a temperature. For example, the second temperature sensor may comprise a thermistor any may indirectly measure a temperature by measuring a resistance of the thermistor. In some instances, the thermistor may be a negative temperature coefficient (NTC) thermistor.

The second temperature sensor may be located at a second location. The second location may be on-board the UAV. In some instances, the second location may be on or near an exterior of the UAV. In some instances, the second location may be on a landing gear of the UAV. In some instances, the second location may be within an interior of a housing of the UAV. Alternatively, the second location may be off-board the UAV. For example, the second location may be on board a remote controller or a mobile device operably coupled to the UAV. In some instances, the second location may be in a general vicinity of the UAV but not operably coupled to the UAV. For example, the second temperature sensor may be provided by third parties (e.g. weather channels, meteorological stations, etc) unaffiliated with the UAV to measure the temperature for their own benefit. The second temperature sensor may be configured to approximate a temperature of the environment in which the UAV operates in. The second temperature sensor may be configured to approximate a temperature of component(s) that can act as a heat source and supply heat to a battery. In addition, the second temperature sensor may be configured to approximate a temperature of component(s) that can act as a heat sink and take away heat from a battery.

One or more processors 1105 may receive information regarding the first temperature and/or the second temperature. For example, the first temperature and/or the second temperature sensed by the temperature sensors may be transmitted to the one or more processors. In some instances, the second temperature may be obtained from sources such as meteorological stations, applications, weather channels through a wireless and/or cellular connection and may be transmitted to the one or more processors. The one or more processors may be provided on-board the UAV. Alternatively or in addition, the one or more processors may be provided off-board the UAV. The one or more processors may, individually or collectively, process the received information to control flight of the UAV, e.g. by imposing restrictions 1109.

In some instances, the one or more processors may compare the second temperature (e.g. temperature of the environment) to one or more predetermined threshold values. The predetermined threshold value may be equal to or lower than about 0° C., −2° C., −5° C., −10° C., −15° C. In some instances, the predetermined threshold value may be equal to or greater than about 25° C., 30° C., 35° C., 40° C., 50° C., 60° C., 70° C., 85° C., or 100° C. If the second temperature is lower than the predetermined threshold value, the one or more processors may impose a restriction on a flight of the UAV. Alternatively, if the second temperature is higher than the predetermined threshold value, the one or more processors may impose a restriction on a flight of the UAV. For example, the UAV may be prohibited from taking off from the ground.

In some instances, processing the information may comprise determining a reference temperature. The reference temperature may be an accurate approximation of a temperature of a battery (e.g. battery cell). In some instances, the reference temperature may an estimated internal temperature of a battery. In some instances, the reference temperature may be determined based on both the first temperature and the second temperature. In some instances, the reference temperature may be determined in part by comparing the first temperature to the second temperature. When the first temperature is less than the second temperature, the reference temperature may be determined to be less than the first temperature. For example, the first temperature of the battery may have increased due to heat exchange and/or conduction (e.g. from the environment, UAV components, etc) and an internal temperature of the battery may be lower than the first temperature.

In some instances, the reference temperature may be calculated by subtracting a predetermined value from the first temperature. The predetermined value may be equal to or less than about 0.1° C., 0.2° C., 0.5° C., 1° C., 2° C., 3° C., 4° C., 5° C., 7° C., or 10° C. In some instances, the reference temperature may be calculated by multiplying the first temperature by a predetermined number. The predetermined number may be equal to or less than 1. For example, the predetermined number may be equal to or less than about 0.9, 0.8, 0.7, 0.6, 0.5, 0.4, 0.3, 0.2, or 0.1. In some instances, the reference temperature may be utilized as a temperature of the battery in imposing restrictions for the vehicle. For example, the reference temperature may be utilized as an operational parameter substantially described throughout.

When the first temperature is greater than the second temperature, the reference temperature may be determined to be equal to the first temperature. For example, the first temperature of the battery may have decreased due to heat exchange and/or conduction (e.g. from the environment, UAV components, etc). However, heat generated by the battery during its operation may be greater than the heat dissipated away and an internal temperature of the battery may not necessarily be higher than the first temperature. In some instances, the reference temperature may be utilized as a temperature of the battery in imposing restrictions for the vehicle. For example, the reference temperature may be utilized as an operational parameter substantially described throughout.

Figure 12:
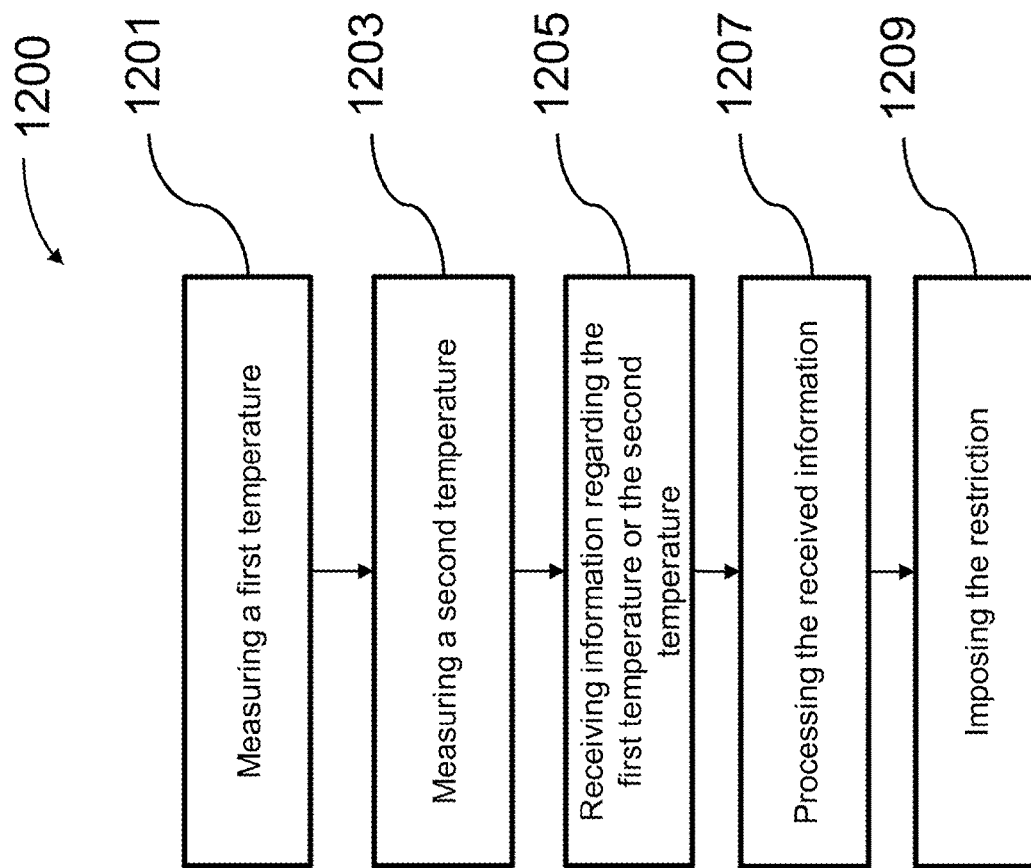
FIG. 12 illustrates a method for operating a vehicle, in accordance with embodiments.

FIG. 12 illustrates a method 1200 for operating a vehicle, in accordance with embodiments. Method 1200 may be an example of a method in which the devices and systems described throughout may be utilized in.

In step 1201, a first temperature may be measured. The first temperature may be a temperature of a battery operably coupled to the vehicle. The first temperature may be measured with aid of a first temperature sensor. The first temperature sensor may be any type of temperature sensor. For example, the first temperature sensor may be a thermistor such as a negative temperature coefficient (NTC) thermistor. The first temperature sensor may be located at a first location. In some instances, the first location may be on board the vehicle. Optionally, the first location may be on or near a battery operably coupled to the vehicle. For example, the first location may be within 2 cm of an exterior of the battery. In some instances, the battery may comprise a battery pack. In such cases, the first location may be between cells of the battery pack.

In step 1203, a second temperature may be measured. The second temperature may be a temperature of an environment. The environment may be an environment around the vehicle. The second temperature may be measured with aid of a second temperature sensor. The second temperature sensor may be any type of temperature sensor. For example, the second temperature sensor may be a thermistor such as a negative temperature coefficient (NTC) thermistor. The second temperature sensor may be located at a second location. In some instances, the second location may be on board the vehicle. Optionally, the second location may be on or near an exterior of the vehicle. In some instances, the second location may be on a landing gear of the vehicle. Alternatively or in addition, the second location may be within an interior of a housing of the vehicle.

Steps 1205-1209 may be accomplished individually or collectively with aid of one or more processors. The one or more processors may be on board the vehicle. Alternatively or in addition, the one or more processors may be operably coupled to the vehicle but may be off board the vehicle. For example, the one or more processors may be located on a controller or a mobile device coupled to the vehicle.

In step 1205, information regarding the first temperature and/or the second temperature may be received, and in step 1207, the received information may be processed. In some instances, processing the information may comprise comparing the second temperature to a temperature threshold. The temperature threshold may be equal or lower than about 0° C., −2° C., −5° C., −10° C., −15° C. or lower. In some instances, the vehicle may be prevented from taking off if the second temperature is below the temperature threshold.

In some instances, processing the information may comprise determining a reference temperature. In some instances, the reference temperature may an estimated internal temperature of a battery. In some instances, the reference temperature may be determined based on both the first temperature and the second temperature.

The reference temperature may be determined in part by comparing the first temperature to the second temperature. In some instances, when the first temperature is less than the second temperature, the reference temperature may be determined to be less than the first temperature. For example, the reference temperature may be determined to be less than the first temperature by a subtracting a predetermined value from the first temperature. For example, the reference temperature may be determined to be less than the first temperature by multiplying the first temperature by a predetermined number. The predetermined number may be equal to or less than 1. For example, the predetermined number may be equal to or less than about 0.9, 0.8, 0.7, 0.6, 0.5, 0.4, 0.3, 0.2, or 0.1. In some instances, when the first temperature is greater than the second temperature, the reference temperature may be determined to be equal to the first temperature. In some instances, when the first temperature equals the second temperature, the reference temperature is determined to be equal to the first temperature.

In step 1209, a restriction affecting operation of the vehicle may be determined and/or imposed based on the processed information. For example, a reference temperature determined in step 1207 may be utilized in determining and/or imposing a restriction on the vehicle. In some instances, the reference temperature may be utilized as a proxy of a temperature of a battery operably coupled to the UAV. In some instances, the reference temperature may be utilized as a more accurate temperature of a battery operably coupled to the UAV as compared to either the first temperature or the second temperature. Accordingly, when the first temperature is less than the second temperature, an operator of the vehicle may have less control over operation of the vehicle as compared to when the first temperature is equal to or greater than the second temperature. In some instances, when the first temperature is less than the second temperature, the vehicle may be configured to enter a warm up mode, substantially as described herein. For example, the warm up mode may be configured to make one or more motors of the vehicle spin such that the vehicle warms up. Optionally, steps 1201 through 1209 may be repeated, e.g. in real time or at predetermined intervals. The predetermined interval may be equal to, or less than about 0.01 s, 0.02 s, 0.05 s, 0.1 s, 0.2 s, 0.5 s, 1 s, 2 s, 5 s, 10 s, 20 s, 50 s, 100 s, 200 s, 500 s, or 1000 seconds. Accordingly, the restriction imposed on the vehicle may varied dynamically, e.g. in real time or at predetermined time intervals.

In some instances, a system may be provided for implementing the method 1200. All elements described in the context of methods applies to the practice of the subject systems, and vice versa. The system may comprise: a first temperature sensor located at a first location configured to measure a first temperature; a second temperature sensor located at a second location configured to measure a second temperature; one or more processors, individually or collectively configured to: receive information regarding the first temperature and/or the second temperature; process the information; and impose a restriction affecting operation of the vehicle based on the processed information.

In some instances, a UAV may be provided for implementing the method 1200. All elements described in the context of methods applies to the practice of the subject UAVs, and vice versa. The UAV may comprise: one or more propulsion units that effect flight of the UAV; a first temperature sensor located at a first location configured to measure a first temperature; a second temperature sensor located at a second location configured to measure a second temperature; one or more processors, individually or collectively configured to: receive information regarding the first temperature and/or the second temperature; process the information; and impose a restriction affecting operation of the vehicle based on the processed information.

In some instances, a non-transitory computer readable medium may be provided for implementing the method 1200. All elements described in the context of methods applies to the practice of the subject computer readable mediums, and vice versa. The computer readable medium may comprise code, logic, or instructions to: receive information regarding a first temperature measured at a first location and/or a second temperature measured at a second location; process the information; and impose a restriction affecting operation of the vehicle based on the processed information.

The systems, devices, and methods provided herein may enable a flight control of a UAV to operate with improved efficiency and predictability. By enabling the UAV to take into account various operational factors or parameters for imposing restrictions on the UAV, an operational capability of the UAV may be matched to what is permitted for the UAV, enabling the UAV to operate as desired in various environments and conditions. In addition, by matching characteristics of the battery system powering the UAV to a propelling system, insufficient and/or over-sufficient power output of the battery is prevented, which may lead to an increased lifetime of the battery, preventing accidents (e.g. crashing of the UAV), and maximizing use of the battery.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
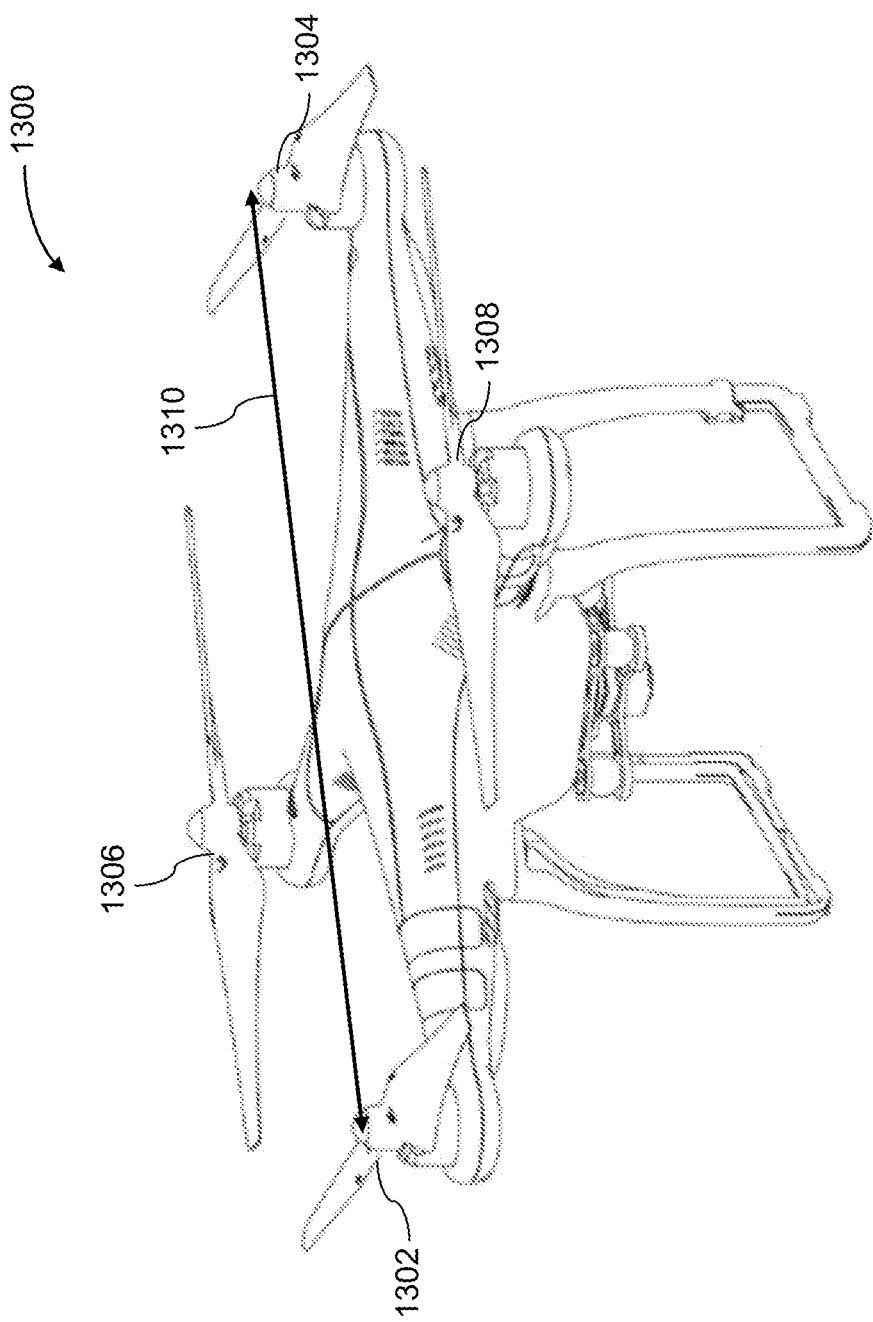
FIG. 13 illustrates an unmanned aerial vehicle, in accordance with an embodiment of the disclosure.

FIG. 13 illustrates an unmanned aerial vehicle (UAV) 1300, in accordance with embodiments of the present disclosure. The UAV may be an example of a movable object as described herein. The UAV 1300 can include a propulsion system having four rotors 1302, 1304, 1306, and 1308. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 1 m, or less than equal to 5 m. In some embodiments, the length 1310 can be within a range from 1 cm to 7 m, from 70 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 14:
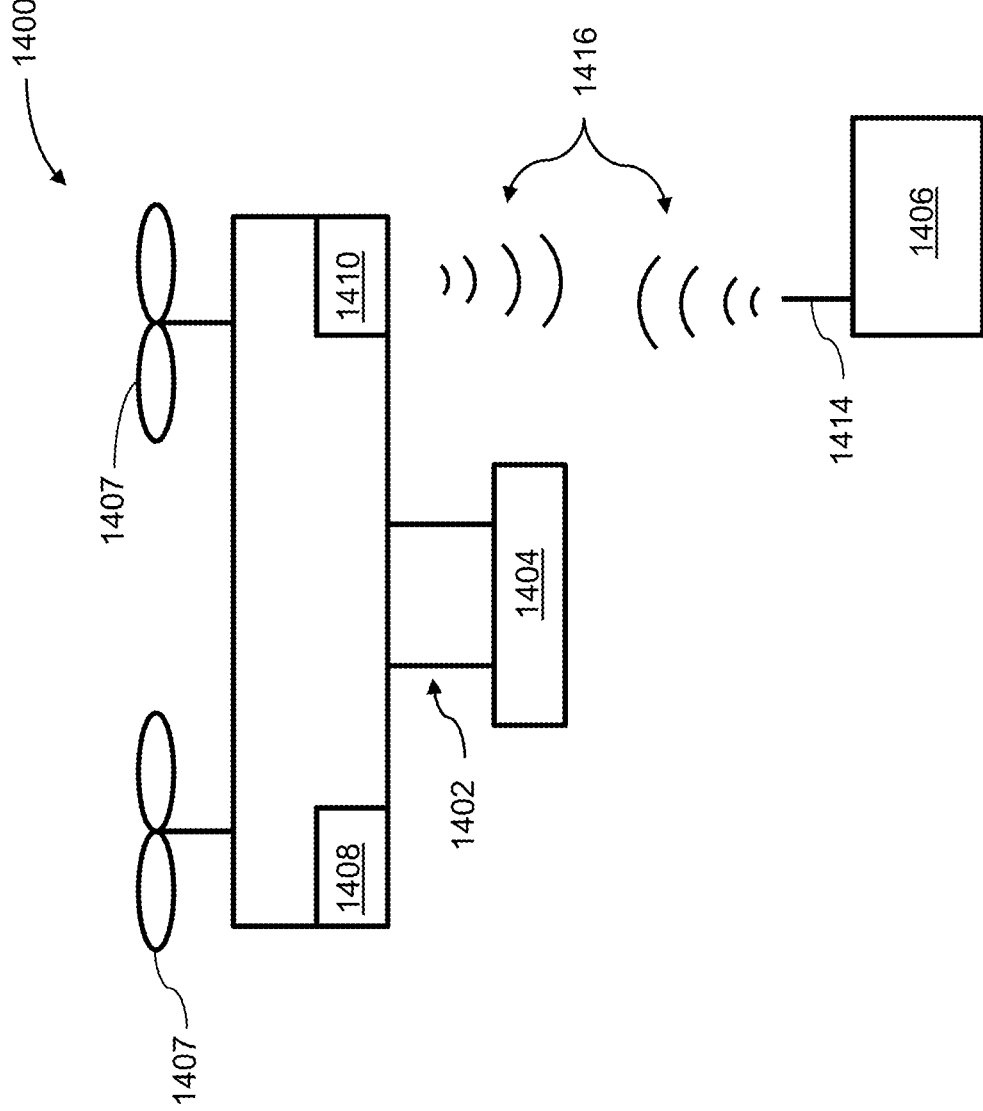
FIG. 14 illustrates a movable object including a carrier and a payload, in accordance with an embodiment of the disclosure.

FIG. 14 illustrates a movable object 1400 including a carrier 1402 and a payload 1404, in accordance with embodiments. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 800 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with terminal 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the terminal 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the terminal 1412. The two-way communication can involve transmitting data from one or more transmitters of the communication system 1410 to one or more receivers of the communication system 1414, and vice-versa.

In some embodiments, the terminal 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1412 can be configured to control a state of one or more of the movable object 1400, carrier 1402, or payload 1404. Alternatively or in combination, the carrier 1402 and payload 1404 can also each include a communication module configured to communicate with terminal 1412, such that the terminal can communicate with and control each of the movable object 1400, carrier 1402, and payload 1404 independently.

In some embodiments, the movable object 1400 can be configured to communicate with another remote device in addition to the terminal 1412, or instead of the terminal 1412. The terminal 1412 may also be configured to communicate with another remote device as well as the movable object 1400. For example, the movable object 1400 and/or terminal 1412 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1400, receive data from the movable object 1400, transmit data to the terminal 1412, and/or receive data from the terminal 1412. Optionally, the remote device can be connected to the Internet or other telecommunications network, such that data received from the movable object 1400 and/or terminal 1412 can be uploaded to a website or server.

Figure 15:
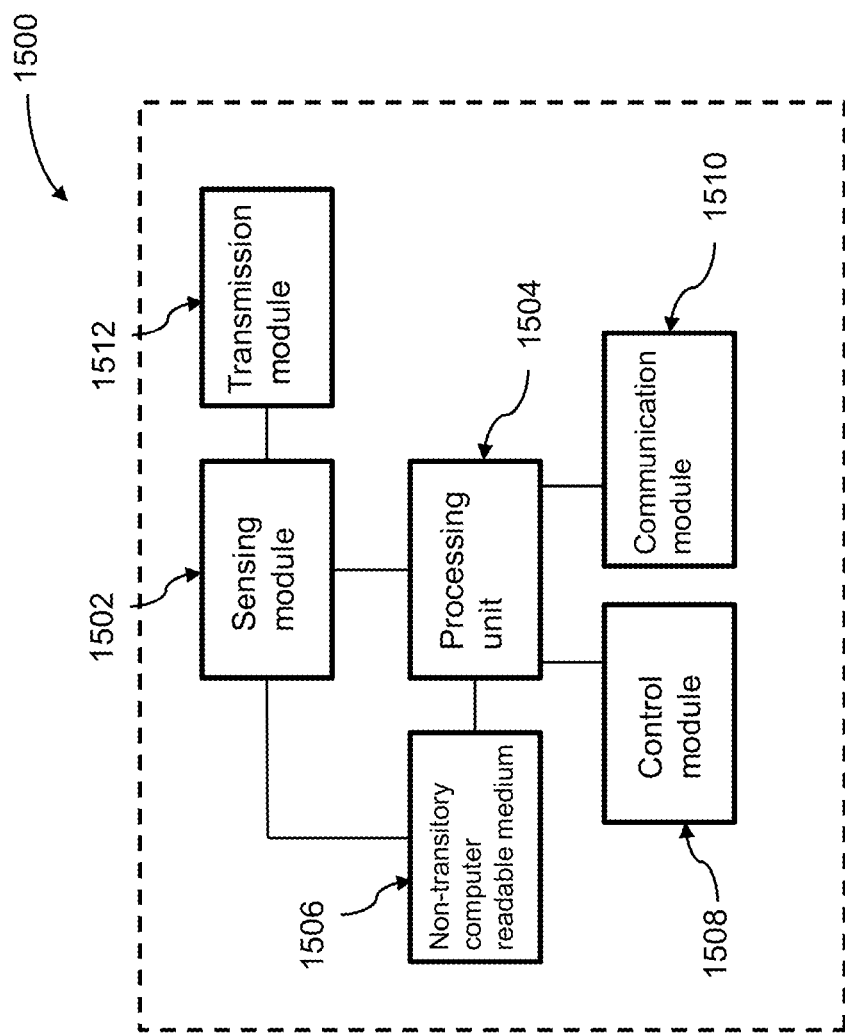
FIG. 15 is a schematic illustration by way of block diagram of a system for controlling a movable object, in accordance with an embodiment of the disclosure.

FIG. 15 is a schematic illustration by way of block diagram of a system 1500 for controlling a movable object, in accordance with embodiments. The system 1500 can be used in combination with any suitable embodiment of the systems, devices, and methods disclosed herein. The system 1500 can include a sensing module 1502, processing unit 1504, non-transitory computer readable medium 1506, control module 1508, and communication module 1510.

The sensing module 1502 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1502 can be operatively coupled to a processing unit 1504 having a plurality of processors. In some embodiments, the sensing module can be operatively coupled to a transmission module 1512 (e.g., a Wi-Fi image transmission module) configured to directly transmit sensing data to a suitable external device or system. For example, the transmission module 1512 can be used to transmit images captured by a camera of the sensing module 1502 to a remote terminal.

The processing unit 1504 can have one or more processors, such as a programmable processor (e.g., a central processing unit (CPU)). The processing unit 1504 can be operatively coupled to a non-transitory computer readable medium 1506. The non-transitory computer readable medium 1506 can store logic, code, and/or program instructions executable by the processing unit 1504 for performing one or more steps. The non-transitory computer readable medium can include one or more memory units (e.g., removable media or external storage such as an SD card or random access memory (RAM)). In some embodiments, data from the sensing module 1502 can be directly conveyed to and stored within the memory units of the non-transitory computer readable medium 1506. The memory units of the non-transitory computer readable medium 1506 can store logic, code and/or program instructions executable by the processing unit 1504 to perform any suitable embodiment of the methods described herein. For example, the processing unit 1504 can be configured to execute instructions causing one or more processors of the processing unit 1504 to analyze sensing data produced by the sensing module. The memory units can store sensing data from the sensing module to be processed by the processing unit 1504. In some embodiments, the memory units of the non-transitory computer readable medium 1506 can be used to store the processing results produced by the processing unit 1504.

In some embodiments, the processing unit 1504 can be operatively coupled to a control module 1508 configured to control a state of the movable object. For example, the control module 1508 can be configured to control the propulsion mechanisms of the movable object to adjust the spatial disposition, velocity, and/or acceleration of the movable object with respect to six degrees of freedom. Alternatively or in combination, the control module 1508 can control one or more of a state of a carrier, payload, or sensing module.

The processing unit 1504 can be operatively coupled to a communication module 1510 configured to transmit and/or receive data from one or more external devices (e.g., a terminal, display device, or other remote controller). Any suitable means of communication can be used, such as wired communication or wireless communication. For example, the communication module 1510 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1510 can transmit and/or receive one or more of sensing data from the sensing module 1502, processing results produced by the processing unit 1504, predetermined control data, user commands from a terminal or remote controller, and the like.

The components of the system 1500 can be arranged in any suitable configuration. For example, one or more of the components of the system 1500 can be located on the movable object, carrier, payload, terminal, sensing system, or an additional external device in communication with one or more of the above. Additionally, although FIG. 15 depicts a single processing unit 1504 and a single non-transitory computer readable medium 1506, one of skill in the art would appreciate that this is not intended to be limiting, and that the system 1500 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1500 can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for operating a vehicle, comprising:
   one or more processors, individually or collectively configured to:
   receive information regarding different temperatures from different temperature sensors at different locations on the vehicle;
   process the information; and
   control, based on the processed information, the vehicle to operate according to one of a plurality of restriction levels, the one of the plurality of restriction levels being determined based on the processed information, and different ones of plurality of restriction levels corresponding to different parameters in the processed information, respectively.

2. The system of claim 1, wherein the one or more processors are configured to determine a reference temperature, the reference temperature being an estimated internal temperature of a battery operably coupled to the vehicle.

3. The system of claim 2, wherein:
   the different temperatures include a first temperature and a second temperature; and
   the one or more processors are further configured to determine the reference temperature by comparing the first temperature with the second temperature.

4. The system of claim 3, wherein the one or more processors are further configured to, in response to the first temperature being less than the second temperature:
   determine the reference temperature to be less than the first temperature by a predetermined value; or determine the reference temperature by multiplying the first temperature by a predetermined number, the reference temperature being less than the first temperature.

5. The system of claim 3, wherein the one or more processors are further configured to determine the reference temperature to be equal to the first temperature in response to the first temperature being greater than or equal to the second temperature.

6. The system of claim 1, wherein:
the different temperatures include a first temperature and a second temperature; and
the one or more processors are further configured to, in response to the first temperature being less than the second temperature, impose the restriction to restrict an operator of the vehicle to have less control over operation of the vehicle as compared to when the first temperature is equal to or greater than the second temperature.

7. The system of claim 1, wherein:
the different temperatures include a first temperature and a second temperature; and
the one or more processors are further configured to, in response to the first temperature being less than the second temperature, impose the restriction to control the vehicle to enter a warm up mode.

8. The system of claim 1, wherein:
the different temperatures include a first temperature and a second temperature; and
the first temperature is a temperature of the battery.

9. The system of claim 1, wherein:
the different temperatures include a first temperature and a second temperature; and
the second temperature is a temperature of an environment surrounding the vehicle.

10. The system of claim 1, wherein:
the different temperatures include a first temperature and a second temperature; and
processing the information includes comparing the first temperature with a temperature threshold.

11. The system of claim 10, wherein the one or more processors are further configured to, in response to the first temperature being below the temperature threshold, impose the restriction to prevent the vehicle from taking off.

12. A method for operating a vehicle, comprising:
obtaining information regarding different temperatures from different temperature sensors at different locations on the vehicle;
processing the information; and
controlling, based on the processed information, the vehicle to operate according to one of a plurality of restriction levels, the one of the plurality of restriction levels being determined based on the processed information, and different ones of plurality of restriction levels corresponding to different parameters in the processed information, respectively.

13. The method of claim 12, further comprising:
determining a reference temperature, the reference temperature being an estimated internal temperature of a battery operably coupled to the vehicle.

14. The method of claim 13,
wherein the different temperatures include a first temperature and a second temperature;
the method further comprising:
determining the reference temperature by comparing the first temperature with the second temperature.

15. The method of claim 14, wherein determining the reference temperature includes:
in response to the first temperature being less than the second temperature,
determining the reference temperature to be less than the first temperature by a predetermined value; or
determining the reference temperature by multiplying the first temperature by a predetermined number, the reference temperature being less than the first temperature.

16. The method of claim 14, wherein determining the reference temperature includes determining the reference temperature to be equal to the first temperature in response to the first temperature being greater than or equal to the second temperature.

17. The system of claim 12, wherein:
the different temperatures include a first temperature and a second temperature; and
imposing the restriction includes in response to the first temperature being less than the second temperature, restricting an operator of the vehicle to have less control over operation of the vehicle as compared to when the first temperature is equal to or greater than the second temperature.

18. The system of claim 12, wherein:
the different temperatures include a first temperature and a second temperature; and
imposing the restriction includes in response to the first temperature being less than the second temperature, controlling the vehicle to enter a warm up mode.

19. A system for operating a vehicle, comprising:
a first temperature sensor located at a first location and configured to measure a first temperature;
a second temperature sensor located at a second location configured to measure a second temperature;
one or more processors, individually or collectively configured to:
receive information regarding the first temperature and/or the second temperature;
process the information; and
controlling the vehicle to operate according to a restriction based on the processed information, the restriction including attenuating an effect of a user input applying on the vehicle, wherein controlling the vehicle to operate according to the restriction includes:
controlling the vehicle to operate according to one of a plurality of restriction levels, the one of the plurality of restriction levels being determined based on the processed information, and different ones of plurality of restriction levels corresponding to different parameters in the processed information, respectively.

* * * * *